US010350508B2

(12) United States Patent
Campbell et al.

(10) Patent No.: US 10,350,508 B2
(45) Date of Patent: Jul. 16, 2019

(54) CONTROLLED THIN FILM VAPOR GENERATOR FOR LIQUID VOLUME REDUCTION

(71) Applicant: R3 Fusion, Inc., Waterford, NY (US)

(72) Inventors: Robert Campbell, Conroe, TX (US); Jeane A. Schalm, Montgomery, TX (US)

(73) Assignee: R3 Fusion, Inc., The Woodlands, TX (US)

( * ) Notice: Subject to any disclaimer, the term of this patent is extended or adjusted under 35 U.S.C. 154(b) by 739 days.

(21) Appl. No.: 14/661,984

(22) Filed: Mar. 18, 2015

(65) Prior Publication Data

US 2016/0271514 A1   Sep. 22, 2016

(51) Int. Cl.
*B01D 1/22* (2006.01)
*C02F 1/08* (2006.01)
(Continued)

(52) U.S. Cl.
CPC ............... *B01D 1/22* (2013.01); *B01B 1/005* (2013.01); *B01D 1/16* (2013.01); *B01D 1/223* (2013.01);
(Continued)

(58) Field of Classification Search
CPC .......... B01D 1/22; B01D 1/223; B01D 1/228; B01D 1/16; B01D 1/26; B01D 1/28; B01D 1/2856; B01B 1/005; B01J 4/002; B01J 4/007; B01J 19/006; B01J 19/0066; B01J 19/1843; B01J 19/1887; B01J 2219/00081; B01J 2219/00085; B01J 2219/00094; B01J 2219/00774; C02F 1/08; C02F 2103/06; C02F 2103/08; C02F 2103/10; Y02A 20/128
See application file for complete search history.

(56) References Cited

U.S. PATENT DOCUMENTS

| 6,397,944 B1 | 6/2002 | Caldwell | |
|---|---|---|---|
| 2010/0288640 A1* | 11/2010 | Jachuck | B01J 4/007 204/519 |
| 2014/0367244 A1* | 12/2014 | Jachuck | B01D 1/16 203/10 |

OTHER PUBLICATIONS

PCT International Search Report and Written Opinion issued in International Application No. PCT/US2016/022419 dated May 26, 2016.

* cited by examiner

*Primary Examiner* — Patrick J Orme
(74) *Attorney, Agent, or Firm* — Greenberg Traurig, LLP; Chinh H. Pham

(57) ABSTRACT

A reactor comprising a plurality of vessels, each having a heat exchange surface for processing a fluid as a thin film flow, the vessels arranged in a concentric manner; a plurality of annular spaces situated between the vessels; and a pathway for directing a heat exchange fluid from one vessel to an adjacent vessel for creating a temperature differential between the heat exchange surfaces and the fluid being processed. A system comprising a fluid source, a reactor, and a vapor outlet and a processed fluid outlet through generated vapor and processed fluid are directed out of the reactor, respectively. A method comprising providing a plurality of concentrically arranged surfaces in spaced relation, distributing a fluid to be processed against the surfaces in a controlled manner to form a substantially uniform thin film flow thereon, and evaporating at least a portion of the fluid being processed along the plurality of surfaces.

21 Claims, 18 Drawing Sheets

(51) Int. Cl.
*B01J 19/00* (2006.01)
*B01J 19/18* (2006.01)
*B01J 4/00* (2006.01)
*B01D 1/16* (2006.01)
*B01D 1/26* (2006.01)
*B01D 1/28* (2006.01)
*B01B 1/00* (2006.01)
C02F 103/08 (2006.01)
C02F 103/10 (2006.01)
C02F 103/06 (2006.01)

(52) U.S. Cl.
CPC .......... *B01D 1/26* (2013.01); *B01D 1/28* (2013.01); *B01D 1/2856* (2013.01); *B01J 4/002* (2013.01); *B01J 4/007* (2013.01); *B01J 19/006* (2013.01); *B01J 19/0066* (2013.01); *B01J 19/1843* (2013.01); *B01J 19/1887* (2013.01); *C02F 1/08* (2013.01); B01J 2219/00081 (2013.01); B01J 2219/00085 (2013.01); B01J 2219/00094 (2013.01); B01J 2219/00774 (2013.01); C02F 2103/06 (2013.01); C02F 2103/08 (2013.01); C02F 2103/10 (2013.01); Y02A 20/128 (2018.01)

Mechanical Vapor Compression Application (1)

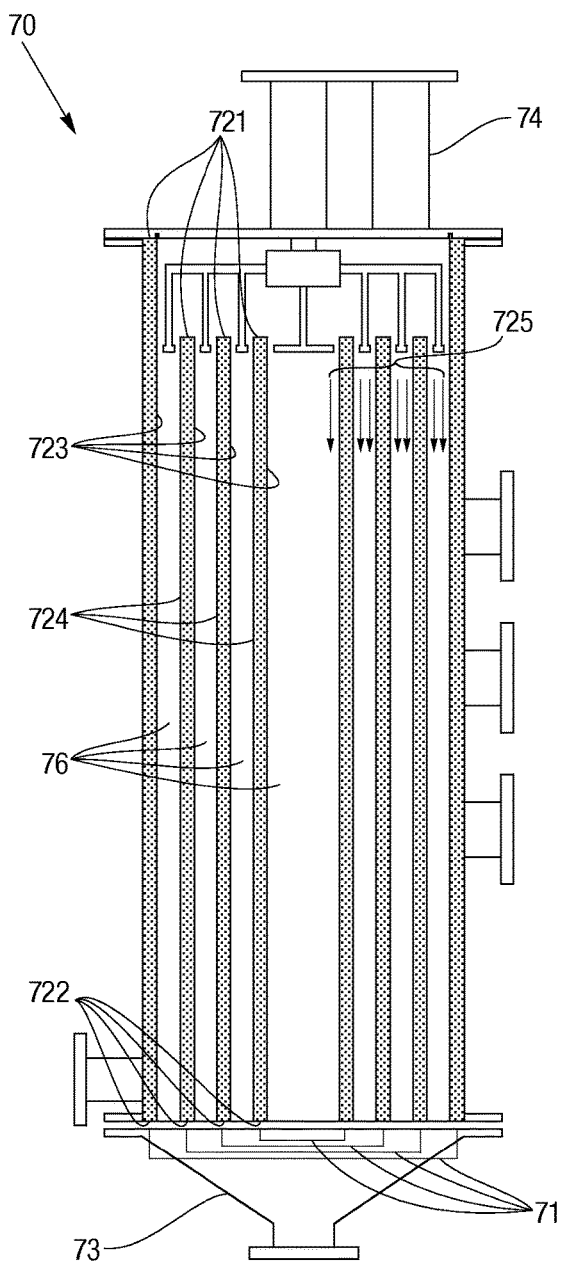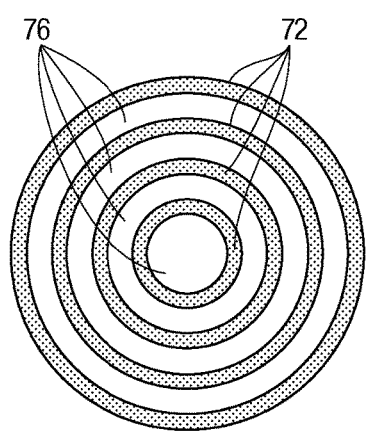
FIG. 8B
FIG. 8A

Schematic of Pathway 78
(indicated by arrows)

Schematic of Pathway 784
(indicated by arrows)

CONTROLLED THIN FILM VAPOR GENERATOR FOR LIQUID VOLUME REDUCTION

TECHNICAL FIELD

The present invention relates to processing reactors, and more particularly, to continuous processing reactors that can impart fluid being processed with high heat transfer and high transport rates. The present invention relates, in particular, to the use of thin film heat transfer for producing vapors, which can be vented, condensed or compressed and can act as a continuous source for the generation of vapor, and for continuous evaporation or distillation of fluids.

BACKGROUND

A common problem in chemical reaction processes is how to achieve the proper hydrodynamics in the reactor to efficiently produce the desired products. In evaporators, for example, non-uniform evaporation of a fluid against the heat transfer surface causes unwanted drying and scaling about the heat transfer surface. For example, as evaporation takes place in conventional thin film reactors, the film thickness of the liquid film undergoing evaporation is continuously reduced. In extreme cases, the reduction in the film thickness creates a dry spot, which eventually results in scaling of the heat transfer surface evaporate surface and corrosion.

Accordingly, there is a need for a thin film reactor with a design that can provide substantially uniform thin film distribution of the fluid or material to be evaporated or condensed onto the heat transfer surface, that can reduce drying or scaling of the fluid precipitate over the heat transfer surface, and that can provide relatively high transport rates, while providing high throughputs.

SUMMARY OF THE INVENTION

The present disclosure is directed to a reactor for processing a fluid. The reactor, in various embodiments, may include a plurality of vessels, each having at least one heat exchange surface along which the fluid being processed can flow as a thin film. The plurality of vessels may be arranged in a substantially concentric manner so as to provide increased surface area for processing within a given footprint. Annular spaces between adjacent vessels may accommodate the fluid being processed and by-products thereof. The reactor further includes a pathway for directing a heat exchange fluid, such as steam, from one vessel to an adjacent vessel. The heat exchange fluid serves to create a temperature differential between the heat exchange surfaces of the vessels and the fluid being processed therealong to facilitate processing of the fluid.

The pathway, in various embodiments, may extend continuously amongst the plurality of vessels. In one such embodiment, the pathway may extend about a circumference of each successive vessel before continuing to an adjacent vessel. The pathway may be defined in part by a gap between an inner surface and an outer surface of each vessel extending about the circumference of the vessel. The pathway may be further defined by one or more conduits connecting the gaps of each successive vessel to provide for the heat exchange fluid to flow continuously between the vessels. These conduits, in an embodiment, may be situated on alternating sides of the reactor such that the pathway enters the gap of a given vessel and travels substantially about the circumference of that vessel before travelling into the gap of the next vessel via the conduit(s) therebetween. Conduits may be distributed axially along each of the gaps to provide for substantially uniform axial distribution of the heat exchange fluid throughout each of the gaps.

The present disclosure is further directed to a system for processing a fluid. The system, in various embodiments, may include a fluid source for accommodating a fluid to be processed, a reactor for processing the fluid from the fluid source, a vapor outlet through which vapor generated from processing the fluid in the reactor may be directed out of the reactor, and a processed fluid outlet through which processed fluid may be directed out of the reactor.

In some embodiments, the vapor outlet may be configured to direct the generated vapor into the atmosphere or into a reservoir, and the processed fluid outlet may be configured to direct the processed fluid towards a reservoir for collection. The system, in such a configuration, may be useful for reducing the volume of the fluid needing to be stored, transported, or the like.

In other embodiments, the system may further include a vapor pathway, in fluid communication with the vapor outlet, for directing the vapor exiting the reactor towards a heat exchange fluid inlet of the reactor. The generated vapor directed along this pathway may contribute to heat transfer with the fluid being processed in the reactor. A compressor may be provided along the pathway for compressing the vapor and thereby adding thermal energy to the vapor. Condensation, resulting from heat transfer away from the vapor, may be directed along a condensate pathway for collection. The processed fluid exiting the reactor through the processed fluid outlet may be directed along a processed fluid pathway towards a reservoir for collection. The system, in such a configuration, may be useful for reducing the volume of the fluid needing to be stored, transported, or the like, as well as for recovering a portion of the fluid as fresh water.

In various embodiments, the system may further include one or more heat exchangers for transferring heat between fluids of the system. In an embodiment, a first heat exchanger, in fluid communication with the processed fluid outlet and the fluid source, may be provided for preheating the fluid to be processed from the fluid source through heat transfer from the processed fluid from the reactor. Additionally or alternatively, in another embodiment, a second heat exchanger, in fluid communication with the condensate outlet and the fluid source, may be provided for preheating the fluid to be processed from the fluid source through heat transfer from the condensate from the reactor. In an embodiment, the first and second heat exchangers may be in fluid communication with one another such that the fluid to be processed is preheated twice before being directed into the reactor.

The present disclosure is further directed to a method for processing a fluid. The method, in various embodiments, may include providing a plurality of surfaces arranged in a substantially concentric manner about a common axis and in spaced relation to one another, distributing a fluid to be processed against the plurality of surfaces in a controlled manner to form a substantially uniform thin film flow thereon, and evaporating at least a portion of the fluid being processed flowing as a thin film along the plurality of surfaces.

BRIEF DESCRIPTION OF DRAWINGS

For a more complete understanding of this disclosure, reference is now made to the following description, taken in conjunction with the accompanying drawings, in which:

FIG. 8A illustrates a side cutaway view of processing reactor according to another embodiment of the present disclosure.

FIG. 8B illustrates a simplified top cutaway view of the processing reactor of FIG. 8A, in accordance with one embodiment of the present disclosure.

DESCRIPTION OF SPECIFIC EMBODIMENTS

Embodiments of the present disclosure generally provide reactors 10, 20, 30, and 70, and systems 40, 50, 60, 80 and 90, for processing a fluid. Various methods for processing a fluid are also provided.

Reactor 10

Figure 1:
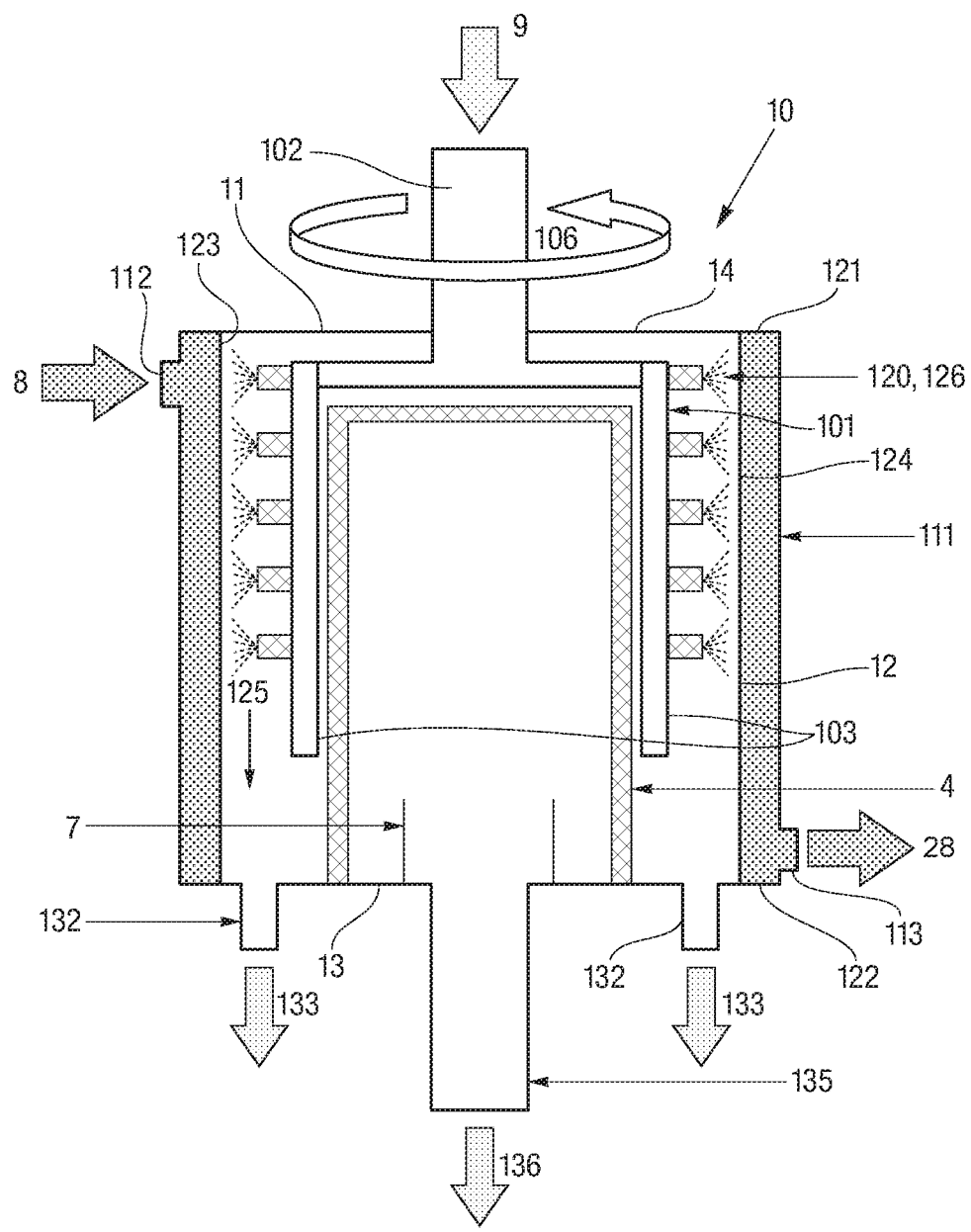
FIG. 1 illustrates a processing reactor according to one embodiment of the present invention.
Figure 2:
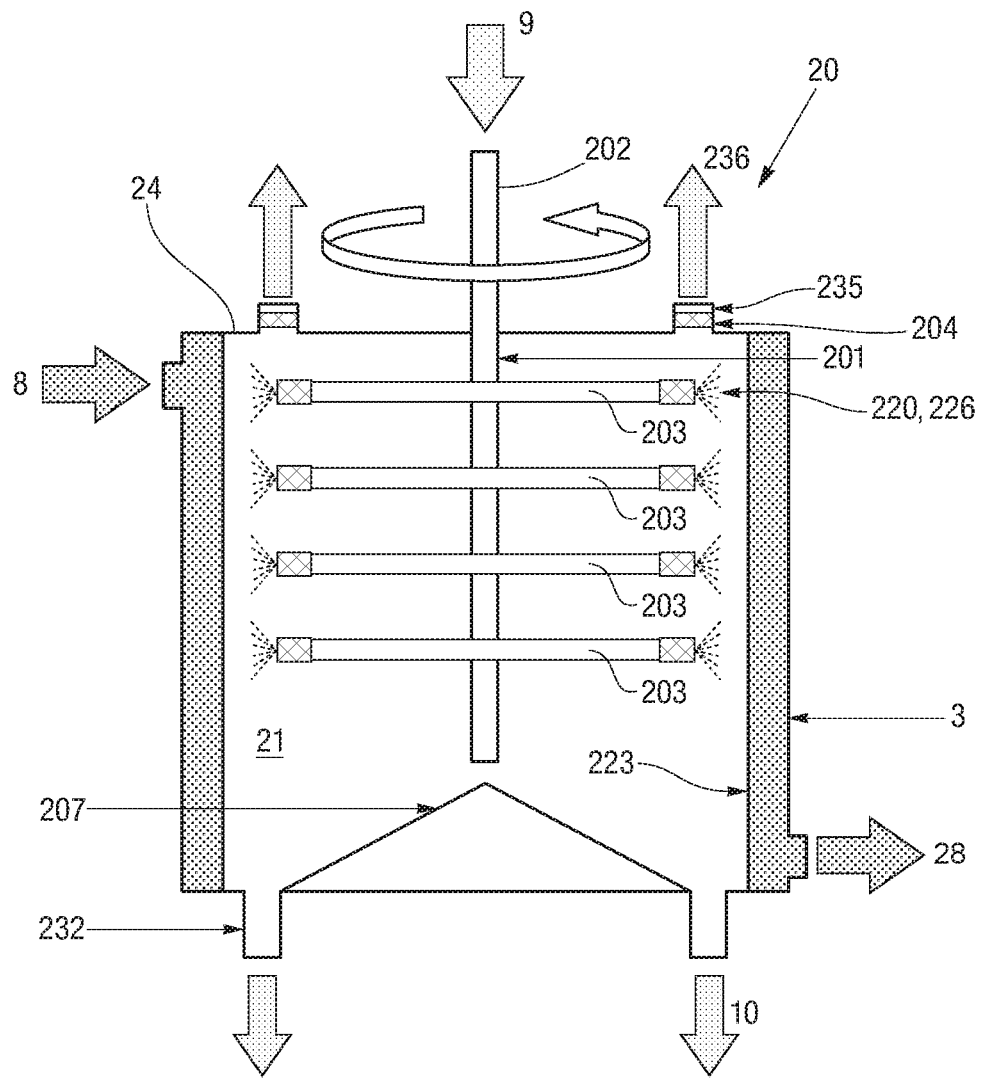
FIG. 2 illustrates a processing reactor according to another embodiment.
Figure 3:
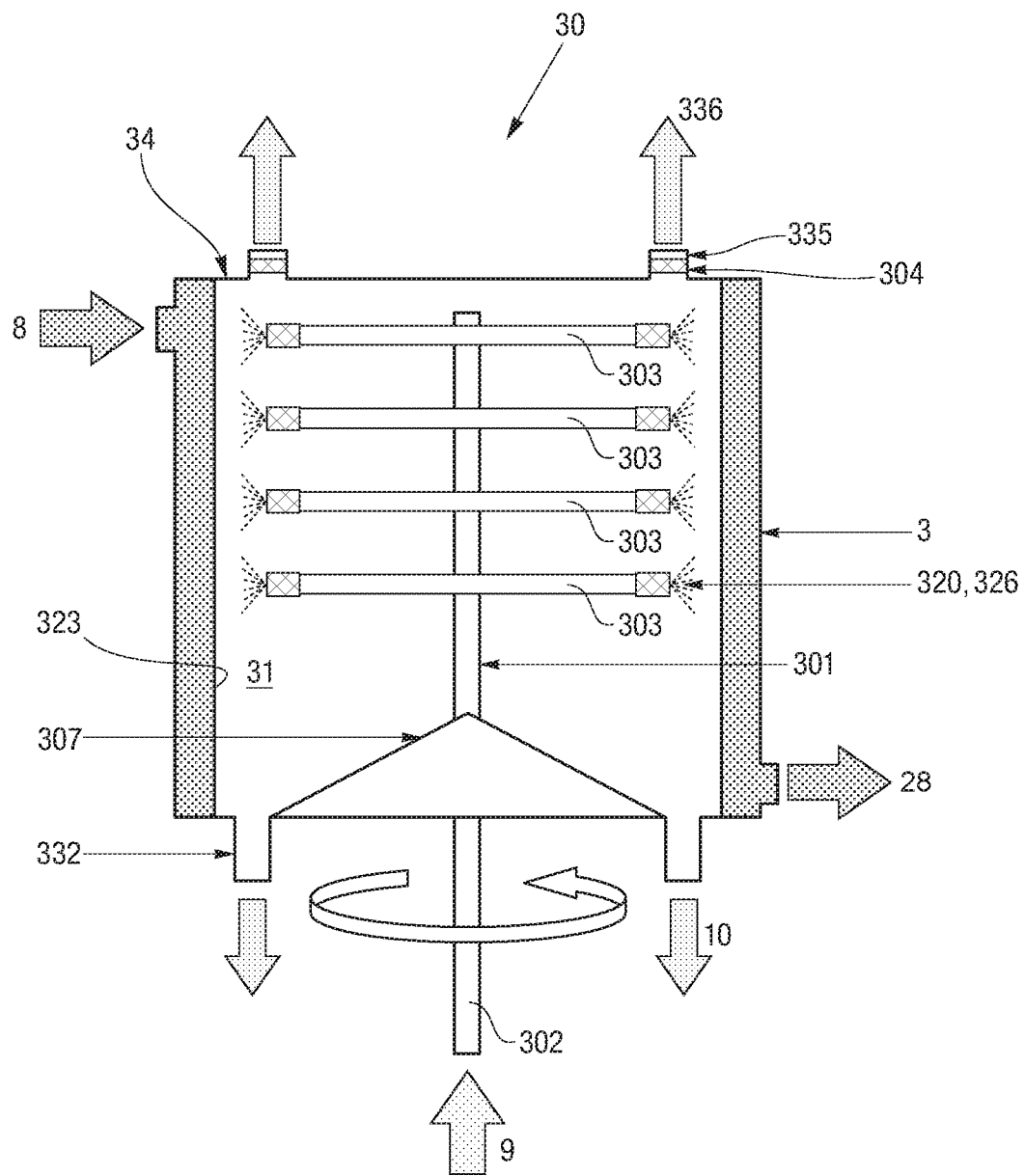
FIG. 3 illustrates a processing reactor according to a third embodiment.

FIGS. 1-3 illustrate representative configurations of reactors 10, 20, 30, and parts thereof. It should be understood that the components of reactors 10, 20, 30, and parts thereof shown in FIGS. 1-3 are for illustrative purposes only, and that any other suitable components or subcomponents may be used in conjunction with or in lieu of the components comprising reactors 10, 20, 30, and the parts of reactors 10, 20, 30, described herein.

Looking now at FIG. 1, in accordance with one embodiment, there is illustrated a reactor 10 for, among other things, continuous processing, for example, controlled, uniform, thin film vapor generation for liquid volume reduction. As illustrated, reactor 10 includes a vessel 11 for accommodating fluids to be processed. The vessel 11, in an embodiment, includes a body portion 12 within which a fluid or fluids to be processed may be accommodated, and if desired, any material to be used in connection therewith. In one embodiment, the body portion 12 may be substantially cylindrical in shape and may include a top end 121 and a bottom end 122. The body portion 12 may also include an inner surface 123 (i.e., heat exchange surface) and an opposing outer surface 124 extending between top end 121 and bottom end 122 of the body portion 12. The inner surface 123, in an embodiment, may be designed so that a fluid being processed may be directed thereonto. In one embodiment, the fluid being processed may be permitted to flow down along the length of the inner surface 123, in the direction of arrows 125, in a thin film. The flow of fluid along inner surface 123, in an embodiment, may be facilitated, for instance, by gravitational force. By allowing the fluid to flow as a thin film, the fluid can be well suited for treatment, processing, and/or separation at a relatively high level of energy efficiency, while imparting the fluid with relatively high transport rates (i.e., thermal transfer, mass transfer and/or mixing rates). In accordance with one embodiment of the present invention, the thin film flow provided on the inner surface 123 of the vessel 11 may have a thickness ranging from approximately 1.0 micron to approximately 1.0 cm. However, it should be appreciated that a thickness less than the range provided or more than the range provided is also contemplated, depending on the particular application, as the reactor 10 of the present invention is not intended to be limited in this manner. Thickness of the thin film may, in some embodiments, be substantially uniform throughout the thin film flow.

As the vessel 11 may be designed to impart to the fluid being processed with relatively high transport rates, to the extent that there may be a desire to further enhance thermal transfer, mass transfer, mixing rates and/or other related high transport rates, the inner surface 123 may be profiled to create additional surface area over which the fluid being processed can flow. In particular, by providing additional surface area over which the fluid can flow, the residence time or time period over which thermal transfer can occur to or from the fluid can increase. The profiled pattern of inner surface 123 can also help to increase surface tension of the fluid flowing along inner surface 123 and can help to maintain a thin film of liquid along the inner surface 123. An example of a profiled pattern for the inner surface 123 includes grooves. The grooves, in an embodiment, may be situated horizontally, vertically, in a zig-zag pattern, or any other designs. Although grooves can be provided along inner surface 123, other profiled patterns can be provided, for instances, indentations, bumps, undulations, so long as the profiling patterns can help to enhance the transport rates.

In addition to or instead of providing the inner surface 123 of body portion 12 with a profiling pattern, the inner surface 123 may include a coating to facilitate treatment, processing, and/or separation, while providing the fluid flowing along the inner surface 123 with relatively high transport rates. In an embodiment, the coating may have any chemical, physical, electrical, magnetic, or other types of properties known in the art.

It should be appreciated that although illustrated as being cylindrical in shape, body portion 12 of vessel 11 may be provided with any shape or configuration, for example, triangular, square, hexagonal, octagonal, or any other geometric configuration at any desired length and diameter, and depending on the application. In addition, as the body portion 12 may need to withstand relatively high internal pressure, the vessel 11 and/or the body portion 12 may be made from any solid material, including metal, metal alloy, plastic, glass, quartz, ceramic, or any other solid materials that can withstand such pressure while permitting thermal transfer, be maintained at a certain temperature, and/or permit a change in temperature as necessary.

Still looking at FIG. 1, vessel 11 of reactor 10 may also include a bottom portion 13 designed to collect and remove, among other things, fluids that have traveled down along inner surface 123 of body portion 12.

To permit removal of processed fluid collected in bottom portion 13, at least one outlet 132 may be positioned at a location along the bottom portion 13, such that removal of the collected fluid can be sufficiently accomplished. In an embodiment, fluid removed from the bottom portion 13 may be collected in a catch basin (not shown) situated near outlet 132 or by any other means known in the art.

In one embodiment, bottom portion 13 may be provided with at least one exhaust, i.e. outlet, 135 to permit removal of any gas or vapor, including gas generated in connection with the processing of the fluid, flowing along inner surface 123 of body portion 12. In one embodiment, when the reactor 10 is used in an evaporative process, the exhaust outlet 135 can permit removal of vapor 136 generated from the evaporation of the fluid flowing along inner surface 123 of body portion 12. Once removed, the vapor 136 can be further vented, condensed or compressed.

As illustrated, bottom portion 13 may be flat in shape. However, it should be appreciated that bottom portion 13 may be conical, parabolic, or provided with any other geometric shape which can complement the geometric profile of the bottom end 122 of body portion 12. The bottom portion 13 can be made from any solid material similar to the material from which body portion 12 is made, including metal, metal alloy, plastic, glass, quartz, ceramic, or any other solid materials that can be maintained at a certain temperature, and/or permit a change in temperature as necessary.

Vessel 11 of reactor 10 may further include a top portion 14 for retaining evaporated vapor from fluids to be processed within the vessel 11. Also, the top portion 14 may be designed to introduce other fluid or fluids into the vessel 11 for use in connection with the fluid being processed.

In one embodiment, top portion 14 may be flat in shape. However, it should be appreciated that top portion 14 may be provided with any geometric shape which can complement the geometric profile of the top end 121 of body portion 12. Moreover, since the top portion 14 may need to withstand high pressure, it may be desirable to make the top portion 14 from any solid material similar to the material from which body portion 12 is made, including metal, metal alloy, plastic, glass, quartz, ceramic, or any other solid materials that can be maintained at a certain temperature, and/or permit a change in temperature as necessary.

It should be noted that although referenced herein as an exhaust, inlet, or outlet, these openings or apertures may be used to either introduce or remove fluid from the vessel 11.

As illustrated, vessel 11 may include a body portion 12 designed to provide a heat exchange surface within reactor 10. In particular, the body portion 12 may include an inner surface 123, and an opposing outer surface 124 along which a heat exchange fluid may flow in a direction that is counter, co-current or in a cross flow configuration with the downward flow of the fluid being processed. The flow of the heat exchange fluid along opposing outer surface 124, in an embodiment, may be facilitated, for instance, by gravitational force. In one embodiment, the heat exchange fluid flowing along the opposing outer surface 124 of vessel 11 may be provided at a different temperature relative the fluid being processed flowing along inner surface 123 of the vessel 11. This may impart a temperature differential between outer surface 124 and inner surface 123. By providing the heat exchange fluid with a different temperature, a predetermined amount of thermal energy can be introduced across the opposing outer surface 124 onto the inner surface 123 of vessel 11 to evaporate the fluid being processed and facilitate relatively high transport rates during treatment, processing and/or separation of the fluid flowing along the inner surface 123 of vessel 11. Examples of a heat exchange fluid include water, oil, glycol mix, Dow Therm™, or any fluid capable of carrying out heat exchange.

To further impart and enhance the transport rates of the fluid being processed along inner surface 123 of vessel 11, an energy source, such as heat pump jacket 111, may be provided about body portion 12 of vessel 11 to act as a source for heating or cooling the fluid flowing along the inner surface 123. For instance, if the evaporation of the descending fluid being processed results in a measurable change in temperature of the descending fluid, jacket 111 may be used to adjust the temperature of the descending fluid up or down, as appropriate, until the desired temperature is achieved to provide controlled evaporation of the fluid being processed along inner surface 123.

Jacket 111, in one embodiment, may be any commercially available heat pump, and may include inductive, resistive, or conductive elements for providing electromagnetic energy, such as microwave energy, to transfer thermal energy to the inner surface 123. The jacket 111 may further include additional components to improve the thermal performance. Alternatively, instead of a heat pump, jacket 111 may be designed to allow a fluid at a relatively raised temperature, e.g. steam or at a relatively cool temperature to run therethrough, in order to act as a source for heating or cooling the fluid flowing along the inner surface 123 of vessel 11. To that end, jacket 111 may include inlet 112, to permit gases, liquids, or other fluids 8 to enter, and outlet 113, to permit the same to exit jacket 111. In an embodiment, jacket 111 may be made from metal, metal alloy, plastic, glass, quartz, ceramic, or any other materials that can maintain and impart heat or cold temperatures.

One of the advantages of the reactor 10 of the present invention is the ability to provide a controlled thin film flow along the inner surface 123 of vessel 11 to facilitate vapor generation for the fluid being processed. To do so, reactor 10 utilizes, in accordance with one embodiment, a fluid dispensing system 101, as illustrated in FIG. 1. Dispensing system 101, in an embodiment, may include a rotatable T-shaped pathway 102, designed to introduce the fluid 9 being processed from a fluid source (not shown) into the interior of vessel 11. Dispensing system 101 may also include a plurality of fluid communicating members 103, such as feed arms, in fluid communication with pathway 102, so that fluid 9 from pathway 102, if desired, can be continuously directed to and subsequently be dispensed by members 103 on to the inner surface 123 of the vessel 11. In one embodiment, the member 103 may be further provided with a plurality of ports 120 for dispensing the fluid to be processed towards the inner surface 123, such as spray nozzles 126 or openings 128 (not shown). In an embodiment, spray nozzles 126 may be adjustable nozzles or electronically controllable nozzles.

According to one embodiment, the ports 120 may be designed to dispense fluid onto the inner surface 123 such that the thin film of the fluid being processed is disturbed. This disturbance can enhance the processing of the fluid flow down the inner surface 123.

Still with reference to FIG. 1, the dispensing system 101 may be concentrically positioned within the vessel 11, such that the T-shaped pathway 102 and vessel 11 may be in substantial axial alignment with one another. According to one embodiment, when the dispensing system 101 dispenses the fluid to be processed towards the inner surface 123, the T-shaped pathway 102 can rotate about an axis in substantial axial alignment with the vessel 11. Alternatively, the vessel 11 can be rotated about an axis and the T-shaped pathway 102 can be kept stationary when the dispensing system 101 may dispense the fluid to be processed. According to another embodiment, the T-shaped pathway 102 and the vessel may be stationary while flow rate of the fluid to be processed may be varied to provide a thin film flow of the fluid to be processed along the inner surface 123.

In an embodiment, the size and diameter of the vessel 11, the spans of the T-shaped pathway 102, the lengths and diameters of the fluid communicating members 103, or any relative ratio of these dimensions to others can vary and can be determined depending on the particular application.

It should be appreciated that the fluid communicating members 103, in an embodiment, can be designed in such a manner that their rotation imparts a centrifugal action, so as to cause fluid received from pathway 102 to be directed outward toward a periphery (i.e., a side of the member 103 along its length proximal to the inner surface 123) of members 103. The rotation of member 103 can further cause the fluid at the periphery of member 103 to be continuously spun off the member 103 into substantially fine droplets or fiber-like elements and on to the inner surface 123 of vessel 11, through openings 128 (not shown) along the length of the members 103, or through spray nozzles 126. The continuous controlled provision of substantially fine droplets or fiber-like elements on to the inner surface 123 allows a thin film flow to be formed as the fluid being processed descends along the inner surface 123.

According to one embodiment, the placement of ports 120 along members 103 can minimize scaling due to heat applied to the inner surface 123. In particular, as the thin film of fluid moves down surface 123, the flow may thin out to a point where the heat from jacket 111 may dry out the thin film near the bottom of surface 123 and cause scaling. By placing the ports 120 in the manner shown in FIG. 1 (shown here as spray nozzles 126), fluid can be dispensed substantially along the length of surface 123 from top to bottom, in a controlled manner, to form a substantially uniform thin film flow, and thereby minimize thinning of the fluid flow and allow for controlled evaporation of the fluid. In an embodiment where a pathway 102 is stationary, additional members 103 can be provided about the pathway 102 with each member 103 having a plurality of ports 120. With additional members 103 and ports 120 to dispense fluid onto surface 123, the chance of scaling on the inner surface 123 can be minimized. It should be appreciated that the number of members 103 can be determined according to the potential coverage area of ports 120—that is, for example, the operating radius of the nozzles 126—and the total area of the inner surface 123. According to one embodiment, the plurality of members 103 and ports 120 can be arranged lengthwise along inner surface 123, which in some embodiments, may coincide with the depth of the vessel 11. According to another embodiment, the plurality of ports 120 may be arranged in a helical pattern within vessel 11. For example, one or more helical members 103 with openings 128 positioned thereon can be provided to dispense the fluid being processed onto the inner surface 123, or a helical arrangement of the nozzles 126 can be provided across the plurality of lengthwise members 103. It should be recognized that the present disclosure should not be limited to the particular embodiments set forth herein, and that dispensing system 101 may comprise any suitable configuration suitable to dispense the fluid substantially along the length of surface 123 from top to bottom, in a controlled manner, to minimize thinning of the fluid flow and allow for controlled evaporation of the fluid.

Dispensing system 101 may further include a motor (not shown) designed to actuate rotation of the T-shaped pathway 102, for instance, in the direction shown by arrow 106, and thus rotation of members 103. The motor, in an embodiment, may be coupled to an end of pathway 102 opposite that to which members 103 are positioned and may be designed to rotate at a sufficient rate. In one embodiment, the rate of rotation of the motor may be controlled so that the rate of rotation can be varied, as desired. For example, the rate can be varied in order to ensure a disturbed flow in a thin film when the flow rate of the fluid may have changed.

Vessel 11, according to an embodiment, also can be provided with a demister 4 to separate vapor generated from aerosolized liquid, i.e. fluid and liquid droplets, that exist in the vapor. The demister 4, according to one embodiment can be made from a filter material such as a carbon filter. The demister 4, in one embodiment, may be shaped into a substantially cylindrical baffle and can be placed over the opening of the outlet 135 through which vapor may be removed from vessel 11. Alternatively, the demister 4 can be shaped into any geometrical shape so long as it prevents aerosolized liquid or solid particles from exiting the vessel through outlet 135. In one embodiment, the demister can also be made from a material such as a carbon filter to be used to absorb light organics from the vapor being removed through outlet 135. Although not shown, it should be appreciated that the demister 4 can be, in one embodiment, shaped so as to cover the opening of the outlet 135 and placed across the opening of outlet 135. According to one embodiment, positioning of the demister between inner surface 123 and outlet 135 can also prevent droplets generated by back splash from being directed into outlet 135 and contaminate the vapor collected.

Looking still at FIG. 1, the vessel 11 can be further provided with a vertical baffle 7 placed concentrically about the outlet 135 so as to provide a barrier so that fluid 133, which may have been separated by the demister 4 and traveled down the demister towards outlet 135, can be prevented from exiting through outlet 135. It should be noted that demister 4 should be sufficiently porous to allow fluid collected about the baffle 7 to move across demister 4 towards outlet 132 for removal.

One advantage of the dispensing system according to the present invention is that it ensures a smooth distribution of fluid thin film and minimizes any hydraulic jump and consequently any liquid carryover to the vapor phase. This is achieved, in part, by dispensing system 101, which may use ports 120 arranged radially as well as along the depth of heat transfer surface, i.e. inner surface 123, so that liquid film thickness of the fluid being processes can be precisely managed. The designs of the dispensing systems, according to various embodiments of the present invention, may be further supplemented by, for example, electronically adjusting the volumetric flow of the liquid through each of the ports 120.

Alternative Designs: Demister and Vapor Removal Outlet

Looking at FIG. 2, according to another embodiment, reactor 20 can be provided with one or more vapor removal outlet 235 placed at top portion 24. According to one embodiment, demister 204 can be provided across the opening of the outlet 235 so as to prevent liquid or solid particles from exiting the vessel 21 through outlet 235.

Similarly, looking at FIG. 3, according to one embodiment, reactor 30 can be provided with one or more vapor removal outlet 335 on the top portion 34. According to one embodiment, demister 304 can be provided across the opening of the outlet 335 so as to prevent liquid or solid particles from exiting the vessel 31 through outlet 335.

Alternative Designs: Dispensing System and Liquid Collection

Looking again at FIG. 2, according to one embodiment, reactor 20 can be provided with a substantially conical body 207 designed to direct processed fluid towards fluid removal outlet 232.

According to the embodiment shown in FIG. 2, the dispensing system 201 may include a rotatable vertical pathway 202, designed to introduce the fluid being processed from a source (not shown) into the interior of vessel 21. Dispensing system 201 may also include a plurality of horizontal fluid communicating members 203, such as a tubing member, in fluid communication with pathway 202, so that fluid from pathway 202, if desired, can be continuously directed to and subsequently be dispensed by members 203 on to the inner surface 223 of the vessel 21. In one embodiment, the member 203 may be further provided with a plurality of ports 220, such as adjustable spray nozzles 226 or openings 228 (not shown), for dispensing the fluid to be processed towards the inner surface 223.

Looking now at FIG. 3, according to one embodiment, reactor 30 can be provided with a dispensing system 301 which combines with a liquid collector 307. In particular, the dispensing system 301 may include a rotatable vertical pathway 302, designed to introduce the fluid being processed from a source (not shown) into the interior of vessel 31. Dispensing system 301 may also include a plurality of horizontal fluid communicating members 303, such as a tubing member, in fluid communication with pathway 302, so that fluid from pathway 302, if desired, can be continuously directed to and subsequently be dispensed by members 303 on to the inner surface 323 of the vessel 31. In one embodiment, the member 303 may be further provided with a plurality of ports 320, such as adjustable spray nozzles 326 or openings 328 (not shown), for dispensing the fluid to be processed towards the inner surface 323.

Operation

In operation, looking again at FIG. 1, a fluid 9 being processed, in general, may be substantially continuously introduced into vessel 11 of reactor 10 through pathway 102. Next, the fluid being processed may be directed into the members 103 where, as a result of centrifugal force due to rotation of the members 103, it may be directed outward toward the periphery of members 103. The rotation of members 103 can further cause the fluid at the periphery to be continuously dispensed from the members 103, through openings 128 (not shown) along the length of the members 103, or through adjustable spray nozzles 126, as substantially fine droplets or fiber-like elements and on to the inner surface 123 of vessel 11. The continuous provision of substantially fine droplets or fiber-like elements on to the inner surface 123 allows a thin film flow to be formed as the fluid being processed descends along the inner surface 123. Additionally, as fluid continues to be dispensed, newly dispensed fluid onto inner surface 123 can disturb the thin film flow, and aid in reduction of scaling during evaporation and the processing of the fluid.

Once the fluid being processed is dispensed onto surface 123, a heat exchange fluid, at a temperature different from that of the fluid being processed, may be provided by the heat pump jacket 111 through inlet 112. In the presence of heat provided by the heat jacket the fluid being processed evaporates within the vessel 11. Subsequently, this heat exchange fluid 28 may be directed exit the jacket 111 through outlet 113 so as to maintain a predetermined heat flux across the opposing outer surface 124 and onto the inner surface 123.

Figure 7:
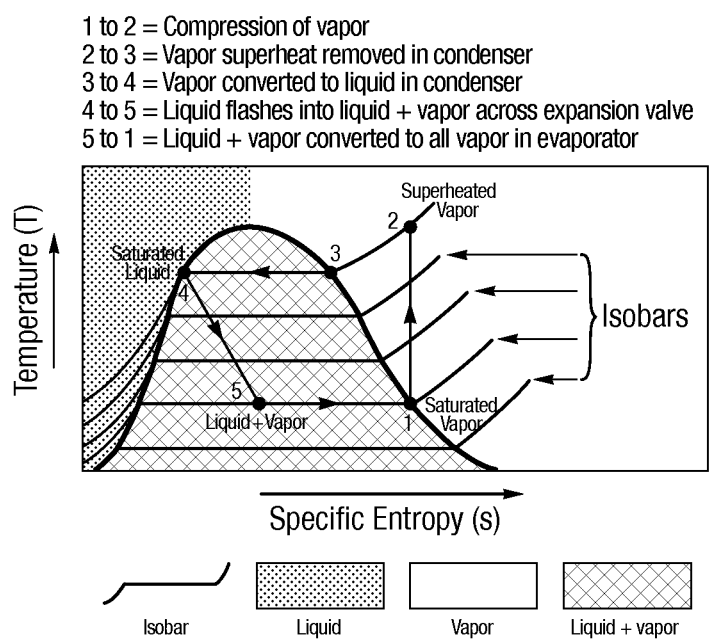
FIG. 7 illustrates temperature to specific entropy relationships during vapor-to-liquid phase transitions.

Vapor generated within vessel 11 can build up in pressure and such pressure can act to push the vapor across demister 4 towards an area of relatively low pressure, i.e. outlet 135. As vapor moves across demister 4, fluid droplets within the vapor may be trapped by the demister 4 and allowed to move down toward bottom portion 13 and directed towards outlet 132 for removal. In doing so, the demister 4 can minimize any hydraulic jump and consequently any liquid carryover to the vapor phase, thereby can ensure a smooth distribution of liquid thin film. According to one embodiment, vapor collected across the demister 4 may be removed by means of a blower or by means of a vacuum pump in communication with outlet 135. According to another embodiment, the vapor generated may be removed by means of a blower situated on top of the reactor and communicated with the vapor removal port thereon, as shown in FIGS. 2-3. As illustrated in FIG. 7, using a vacuum pump may create a negative pressure inside the reactor and may reduce the boiling point of the liquid being evaporated.

For any remaining fluid descending the surface 123, once it reaches bottom portion 13, it can be directed into outlet 132 and removed from vessel 11.

The design of the reactor 10 of the present invention, which provides a controlled thin film flow, an increase in the surface area as well as the residence time for which the fluid can be processed, i.e. evaporated, and the ability to impart a difference in temperature between the thin film fluid being processed and the heat exchange surface, can enhance treatment, processing and/or evaporation of the fluid being processed, while imparting such fluid with relatively high transport rates. In addition, because of the ability to continuously control thin film flow of fluid over a substantially large surface area, reactor 10 of the present invention can reduce scaling along the heat transfer surface, i.e. the inner surface 123 during evaporation, and can provide substantially high throughput processing of the fluid or fluids involved.

Reduced Energy Operation by Mechanical Vapor Compression

Figure 4:
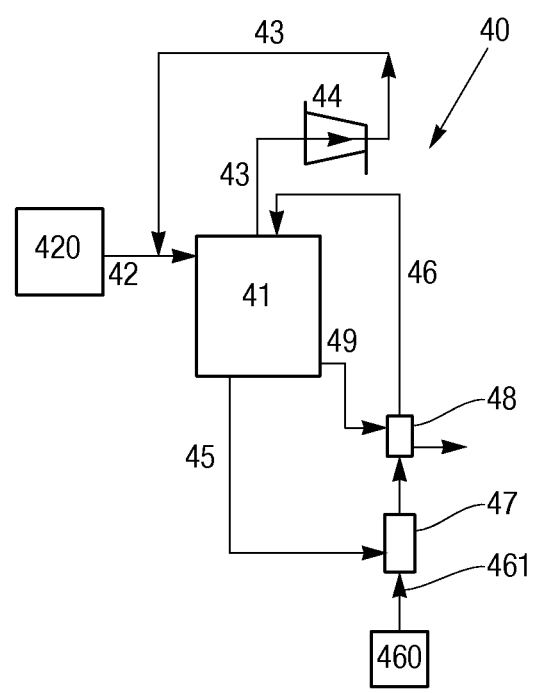
FIG. 4 illustrates a reactor stage according to one embodiment of the present invention.
Figure 5:
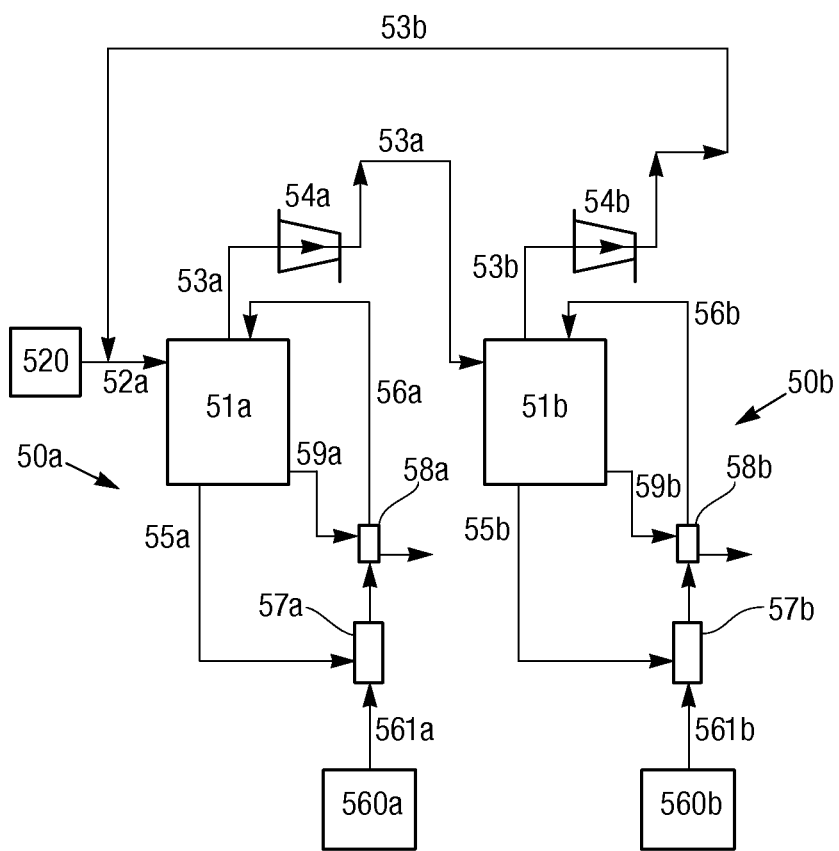
FIG. 5 illustrates a two-stage processing system according to an embodiment.
Figure 6:
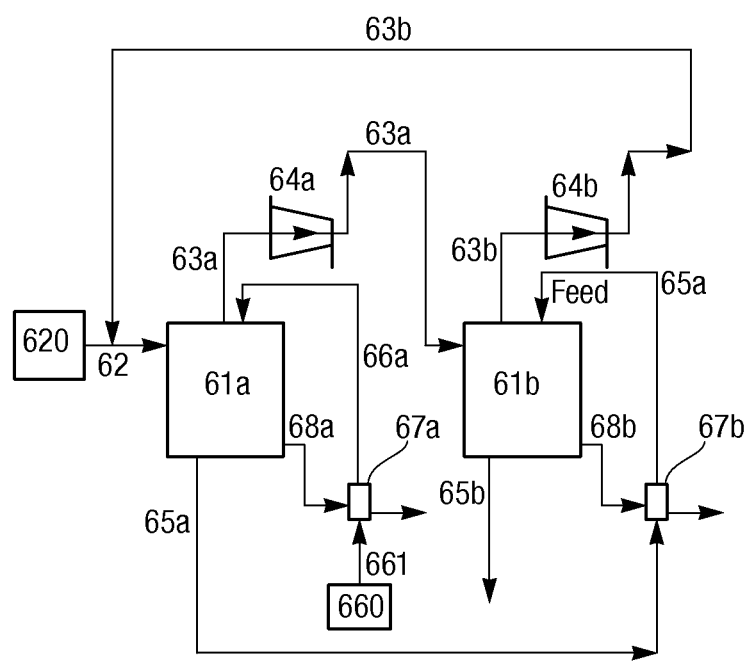
FIG. 6 illustrates a two-stage processing system according to another embodiment.

FIGS. 4-6 illustrate representative configurations of reactor systems 40, 50, 60, and parts thereof. It should be understood that the components of reactor systems 40, 50, 60, and parts thereof shown in FIGS. 4-6 are for illustrative purposes only, and that any other suitable components or subcomponents may be used in conjunction with or in lieu of the components comprising reactor systems 40, 50, 60, and the parts of reactor systems 40, 50, 60, described herein.

As illustrated in FIG. 4, a reactor system 40 is provided for processing fluid in accordance with an embodiment of the present invention. In particular, reactor 41 can be any of the reactors illustrated in FIGS. 1-3. According to one embodiment, a boiler 420 may be initially used to generate a supply of fluid vapor (i.e., a heat exchange fluid) to provide, via a pathway 42, thermal energy through the heat jacket to the reactor 41.

A fluid to be processed in reactor 41 may be provided by a supply pathway 461 from a fluid source 460. In an embodiment, a one or more heat exchangers, such as heat exchangers 47 and 48, may be in fluid communication with, and in proximity to, reactor 41 along pathway 46. In various embodiments, a pathway, such as pathway 45 or 49, may direct a heating fluid from reactor 41 to heat exchangers 47,48 to increase the temperatures of the heat exchangers, and thus, transfer heat from the heating fluid to the fluid to be processed. In an embodiment, the heating fluid may include processed fluid from reactor 41, which is directed via pathway 45 to heat exchanger 47. In another embodiment, the heating fluid may include the heat exchange fluid from the heat transfer jacket of reactor 41, such as that provided by boiler 420. In yet another embodiment, the heat exchange fluid may, additionally or alternatively, include vapor generated from processing the fluid in the reactor. For example, as later described, vapor generated within reactor 41 may be directed from reactor 41 back into the heat pump jacket of reactor 41 via pathway 43. In various embodiments, the fluid to be processed may be preheated via one or both of heat exchangers 47 and 48, as previously described, and in any suitable order.

The fluid to be processed may be directed along pathway 46 into reactor 41 for processing. Vapor generated from processing the fluid can be directed out of reactor 41 along pathway 43, and in an embodiment, into compressor 44. The vapor may gain thermal energy in the form of heat by being compressed by the compressor 44. This heating process is also illustrated in FIG. 7, with respect to transition "1 to 2." The heated, compressed vapor may then be returned to the heat transfer jacket of reactor 41 by way of path 43, and may be used to heat reactor 41.

One advantage of reactor system 40, according to the present invention, is that boiler 420, used to supply thermal energy to the reactor 41, may be operated at a reduced energy consumption level after reactor 41 begins a continuous operation. According to one embodiment, boiler 420 may be initially used to generate a supply of vapor to provide thermal energy through the heat jacket of reactor 41. As reactor 41 evaporates a fluid, the condensed (i.e., processed) fluid, the vapor from boiler 420, and the vapor generated from the fluid may be sources of thermal energy for system 40 for subsequent processing. Furthermore, as generated vapor exits the reactor 41, thermal energy can be more efficiently added to the generated vapor by mechanical compressor 44 when compared with the energy efficiency of boiler 420. Subsequently, according to one embodiment, vapor produced from the evaporation process inside reactor 41 may be compressed again and fed back into the heat jacket of reactor 41. This cycling of vapor can reduce or eliminate the need of an external boiler, such as boiler 420, once the reactor 41 has begun its continuous processing, i.e. evaporation.

According to another embodiment, the design of FIG. 4 can be used in conjunction with one or more additional reactors to increase throughput of the process of the present invention. Looking at FIG. 5, each reactor 51a, 51b may be in fluid communication with a fluid source 560 of a fluid to be processed. One or more supply pathways 561 may direct fluid to be processed toward reactor 51 from fluid source 560. The term "fluid source" is used broadly herein, and may refer to any reservoir(s), container(s), conduit(s), or similar structure, or a combination thereof, configured to accommodate one or more fluids to be processed. For example, fluid source 560 may comprise a single reservoir containing either a single fluid, or multiple fluids (perhaps separated from one another by walls defining sub-reservoirs) to be processed. As another example, as shown in FIG. 5, fluid source 560 may comprise multiple reservoirs 560a, 560b, each containing a common fluid type, or alternatively, different fluids to be processed. Use of multiple reactors 51 may serve to increase processing throughput of fluid(s) to be processed from fluid source 560 by system 50. A boiler 520 can be used to provide a heat exchange fluid, such as steam, as a heating fluid for the heat jacket of reactor 51a.

Reactors 51a and 51b may be in series and placed in circular fluid communication with one another to enhance the efficient use of heat within system 50. In particular, system 50 may comprise a pathway 53a for directing vapor removed from reactor 51a to a heat jacket of reactor 51b to help reactor 51b evaporate incoming fluid to be processed being fed into reactor 51b from source 560b via pathway 561b. In an embodiment, compressor 54a along pathway 53a may compress the removed vapor before it is fed into the heat transfer jacket of the reactor 51b. Similarly, vapor removed from reactor 51b may, in an embodiment, be compressed by compressor 54b, and then fed into the heat transfer jacket of reactor 51a via pathway 53b, thereby completing a circular communication between the two reactors 51a and 51b, and in an embodiment, systems 50a and 50b. It should be appreciated that any number of reactor stages 50 can be circularly communicated according to the present invention, thereby increasing the total throughput of the processing provided by the reactor stages and promoting the efficient use of heat across system 50.

It should also be appreciated that thermal energy from fluids, such as a heating fluid (i.e., processed fluid from reactors 51a, 51b, condensed vapors from boiler 520, and/or generated vapor from reactors 51a,51b), may be used to preheat the fluid to be processed as it is directed from fluid source 560 towards reactors 51a,51b. For example, a heating fluid may be directed from reactors 51a,51b toward heat exchangers 57a,58a and 57b,58b via pathways 55a,59a and 55b,59b to increase the temperature of those heat exchangers. Meanwhile, the fluid to be processed is received from supply pathways 561a,561b and preheated by heat exchangers 57a,58a and 57b,58b before being directed toward reactors 51a, 51b along pathways 56a, 56b. It should be further appreciated that a fewer number of heat exchangers can be used to transfer the thermal energy from the removed processed fluid and the heating fluid.

One advantage of the circularly communicated reactor systems 50a, 50b, as illustrated in FIG. 5, is that the thermal energy from the processed fluid steam and the condensed vapor from the heat jacket may be recovered to preheat the incoming feed fluid to be processed, thereby achieving a high recovery rate. In these embodiments, each unit stage of reactor may be capable of achieving approximately 60% recovery rate depending on the liquid flow rate (production of vapor from liquid). Another advantage is that since a high energy recovery rate may be possible, the reactor stages may be operated without an external boiler once the heat transfer is initiated and a steady state continuous processing is achieved.

Now looking at FIG. 6, according to one embodiment, a first reactor system 60a may be communicated in series with a second reactor system 60b to further process a fluid, e.g. further evaporation or distillation, so as to remove a substantial amount of fluid, for instance water, and provide a relatively high concentrated product that can be subsequently disposed.

According to one embodiment, a boiler 620 can be used to provide, via pathway 62, steam as a heat exchange fluid for the heat jacket of reactor 61a. Hot condensed steam from heat jacket of the reactor 61a may be directed via pathway 68a to heat exchanger 67a to preheat incoming fluid to be processed received by heat exchanger 67a from fluid source 660 via supply pathway 661. The fluid to be processed may then be directed towards reactor 61a via pathway 66a, and dispensed along an inner surface of the reactor 61a. In the presence of heat from the heat jacket, fluid traveling along the inner surface of the reactor 61a is evaporated and vapor is generated. The vapor can be removed from reactor 61a and directed via pathway 63a to, in an embodiment, compressor 64a. Compressor 64a may then compress the vapor so as to provide additional thermal energy into the vapor before the vapor is directed into the heat jacket of reactor 61b via pathway 63a. This process may be reciprocated as previously described (i.e., vapor removed from reactor 61b may be directed along pathway 63b, through compressor 64b, and into a heat jacket of reactor 61a), similar to the circular arrangement of reactor stages in FIG. 5. However, unlike FIG. 5, here in FIG. 6, processed fluid from reactor 61a is directed along pathway 65a fed into reactor 61b for further evaporation, and a final distilled fluid is provided, which may be removed from reactor 61b via pathway 65b.

In particular, according to the embodiment shown in FIG. 6, processed fluid may be removed from reactor 61a, and may be subsequently fed into reactor 61b for further processing, i.e. further evaporation, via pathway 65a. This incoming fluid feed for reactor 61b, i.e. processed fluid from reactor 61a, can be preheated by a heat exchanger 67b, which may be in fluid communication with the heat jacket of reactor 61b and receive thermal energy from a heating fluid provided therefrom (i.e., the hot condensed steam removed from the heat jacket of reactor 61b). As the fluid may be further processed by reactor 61b, i.e. further evaporated, a relatively high concentrate level product, which may be in a slurry-like state by this point, may be removed from reactor 61b for further disposal via pathway 65b.

One advantage of embodiment illustrated in FIG. 6 is that the distillation or evaporation of the fluid may be maximized such that the physical weight of the processed fluid can be minimal, which may benefit subsequent disposal including further chemical treatment or physical transportation.

Potential Applications

The reactors described above, with respect to FIGS. 1-6, can be used in a number of evaporation or distillation applications. For example, the reactors described above can be provided as a fruit juice concentrator, in which water vapor can be extracted from the juice thereby concentrating the juice. Also, the vapor generated can be compressed and used in mechanical vapor compression technologies such as desalination of briny water. Also, the reactors can be provided to reduce the volume of leachate produced in landfills by vaporizing the water. As another example, the reactors can be provided to reduce the volume of produced and flow backwater generated during a natural gas fracking process.

Reactor 70

FIGS. 8A-16 illustrate representative configurations of a reactor 70, and parts thereof. It should be understood that the components of reactor 70, and parts thereof shown in FIGS. 8A-16, are for illustrative purposes only, and that any other suitable components or subcomponents may be used in conjunction with or in lieu of the components comprising reactor 70, and the parts of reactor 70, described herein.

Looking now at FIG. 8A, in accordance with one embodiment, there is illustrated a reactor 70 for, among other things, continuous processing, for example, controlled, uniform, thin film vapor generation for liquid volume reduction. As illustrated, reactor 70 includes a plurality of vessels 71 for accommodating a fluid or fluids to be processed. Vessels 71, in an embodiment, may include a body portion 72 within which the fluid to be processed may be accommodated, and if desired, any material to be used in connection therewith. In one embodiment, body portion 72 may be substantially cylindrical in shape and may include a top end 721 and a bottom end 722. The body portion 72 may also include an inner surface 723 and an opposing outer surface 724 extending between top end 721 and bottom end 722 of the body portion 72. In some embodiments, body portion 72 may further include a gap 726 between inner surface 723 and outer surface 724, so as to define a substantially hollow pathway 728 there between through which a heat exchange fluid may be directed in proximity to surfaces 723,724, as later described.

Inner surface 723 and/or outer surface 724, in various embodiments, may be designed so that a fluid being processed may be directed thereon. In one embodiment, the fluid being processed may be permitted to flow down along the length of surfaces 723,724 in the direction of arrows 725, in a thin film. The flow of fluid along surfaces 723,724 in an embodiment, may be facilitated, for instance, by gravitational force. By allowing the fluid to flow as a thin film, the fluid can be well suited for treatment, processing, and/or separation at a relatively high level of energy efficiency, while imparting the fluid with relatively high transport rates (i.e., thermal transfer, mass transfer and/or mixing rates). As such, those surfaces 723,724 on which the fluid is processed may be referred to as heat exchange surfaces herein.

It should be appreciated that any number and combination of surfaces 723,724 of vessels 71 may be utilized as heat exchange surfaces for processing of the fluid. That is to say, in some cases, all surfaces 723,724 may act as heat exchange surfaces, while in other cases, only some of surfaces 723,724 may be utilized for this purpose. Generally speaking; however, the more surfaces 723,724 provided as heat exchange surfaces, the more processing surface area that is made available within the footprint of reactor 70. Of course, just because a surface 723,724 is provided as a heat exchange surface (i.e., the surface is designed to receive fluid thereon in a thin film flow for processing) does not necessarily mean it must be utilized as such. In some embodiments, only some of the provided heat exchange surfaces 723,724 may be utilized for processing despite others being available within the same reactor 70. Such use may be beneficial in situations where there is a smaller volume of fluid to process and/or where energy savings are desirable, amongst others.

In accordance with one embodiment of the present invention, the thin film flow provided on surfaces 723,724 of vessels 71 may have a thickness ranging from approximately 0.001 mm to approximately 10 mm, and more preferably, between about 0.5 mm and about 1.0 mm. However, it should be appreciated that a thickness less than the range provided or more than the range provided is also contemplated, depending on the particular application, as the reactor 70 of the present invention is not intended to be limited in this manner. Thickness of the thin film may, in some embodiments, be substantially uniform throughout the thin film flow.

As vessels 71 may be designed to impart to the fluid being processed with relatively high transport rates, to the extent that there may be a desire to further enhance thermal transfer, mass transfer, mixing rates and/or other related high transport rates, surfaces 723,724 may be profiled to create additional surface area over which the fluid being processed can flow. In particular, by providing additional surface area over which the fluid can flow, the residence time or time period over which thermal transfer can occur to or from the fluid can increase. The profiled pattern of surfaces 723,724 can also help to increase surface tension of the fluid flowing along surfaces 723,724 and can help to maintain a thin film of liquid along surfaces 723,724. An example of a profiled pattern for surfaces 723,724 includes grooves. The grooves, in an embodiment, may be situated horizontally, vertically, in a zig-zag pattern, or any other designs. Although grooves can be provided along surfaces 723,724, other profiled patterns can be provided, for instances, indentations, bumps, undulations, so long as the profiling patterns can help to enhance the transport rates.

In addition to or instead of providing the surfaces 723,724 of body portion 12 with a profiling pattern, the surfaces 723,724 may include a coating to facilitate treatment, processing, and/or separation, while providing the fluid flowing along surfaces 723,724 with relatively high transport rates. In an embodiment, the coating may have any chemical, physical, electrical, magnetic, or other types of properties known in the art. A thin layer of nickel may be applied to one or both surfaces 723,724, in an embodiment, to provide corrosion resistance.

It should be appreciated that these and other design aspects of surfaces 723,724 may vary amongst the plurality of vessels 71 of reactor 70. That is, some surfaces 723,724 may include a profiled pattern or a coating (or other design aspect), while others may not, or instead include different design aspects.

It should be further appreciated that although illustrated as being cylindrical in shape, body portion 72 of vessels 71 may be provided with any shape or configuration, for example, triangular, square, hexagonal, octagonal, or any other geometric configuration at any desired length and diameter, and depending on the application. In addition, as body portion 72 may need to withstand relatively high internal pressure, vessels 71 and/or corresponding body portions 72 may be made from any solid material, including metal, metal alloy, plastic, glass, quartz, ceramic, or any other solid materials that can withstand such pressure while permitting thermal transfer, be maintained at a certain temperature, and/or permit a change in temperature as necessary. In an embodiment, body portion 72 may be made of 16 gauge patterned stainless steel, such as Rimex™.

Vessels 71, in one embodiment, may be arranged in a substantially concentric manner so as to provide increased surface area for processing the fluid within a given footprint of reactor 70. In such an arrangement, annular spaces 76 may be provided between adjacent vessels 71 for accommodating the fluid being processed on inner surface 723 of the outer adjacent vessel and/or on outer surface 724 of the inner adjacent vessel 71. As processing of the fluid on surfaces 723,724 may produce by-products, such as steam, annular spaces 76 may be of suitable width to accommodate these as well. In an embodiment, annular spaces have a width of about 0.5 inches to about 5 inches. Testing has shown that a 2-inch thick annular space 76 seems to work well with thin film flows of between about 5 mm and about 1 mm on bordering heat exchange surfaces. Of course, to the extent the fluid being processed and the by-products thereof can be accommodated within annular spaces 76, the width of these annular spaces 76 may be decreased in favor of accommodating more vessels within reactor. However, it should be appreciated that a width less than the range provided or more than the range provided is also contemplated, depending on the particular application, as reactor 70 of the present invention is not intended to be limited in this manner. In some embodiments, annular space width may vary within a given reactor 70, often decreasing towards the center because a lesser volume of fluid need be accommodated therein due to the decreasing processing surface area of the smaller vessels 71 towards the center of reactor 70.

Figure 9A:
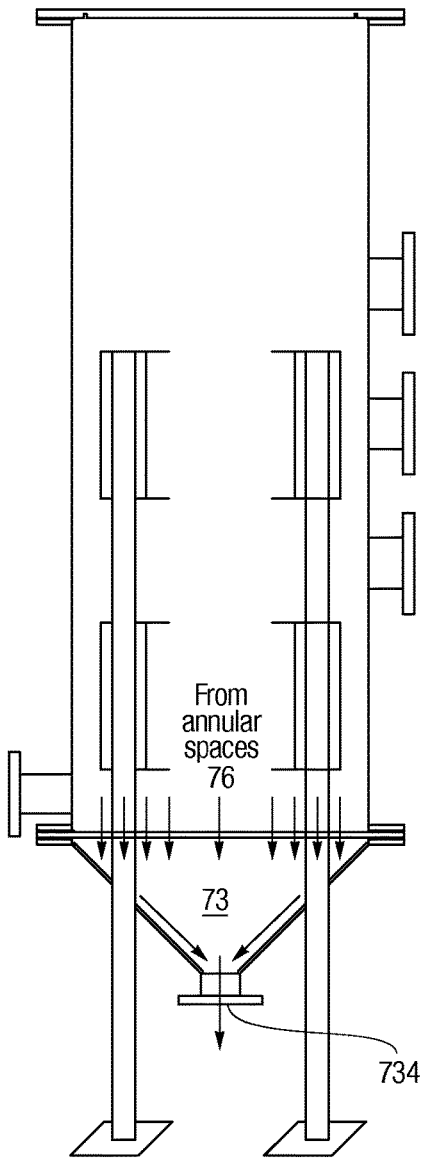
FIG. 9A illustrates a schematic view of processed fluid entering a bottom portion of a processing reactor according to an embodiment of the present disclosure.
Figure 9B:
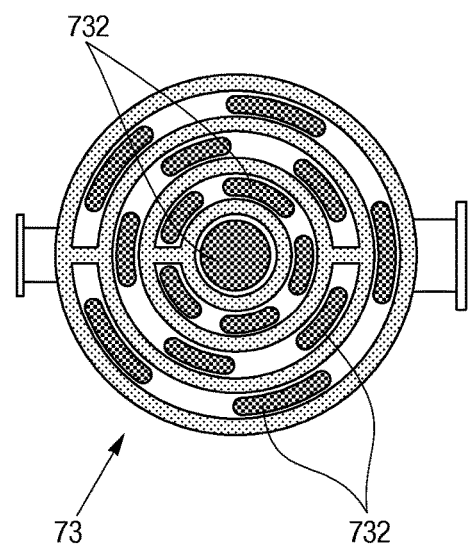
FIG. 9B illustrates a top view of a bottom portion of a processing reactor according to an embodiment of the present disclosure.

Referring now to FIGS. 9A and 9B, reactor 70 may also include a bottom portion 73 designed to collect and remove, among other things, fluids that have traveled down along surfaces 723, 724 associated therewith. For example, in the illustrative embodiment shown, bottom portion 73 may be situated at the bottom of the annular spaces 76 formed between the vessels 71. In such an arrangement, bottom portion 73 may collect and remove fluids that have traveled down along surfaces 723,724 bordering the annular spaces 76.

To permit removal of processed fluid collected in bottom portion 73, at least one outlet 732 (e.g., drain hole) may be positioned along the bottom portion 73, such that removal of the collected fluid can be sufficiently accomplished. In an embodiment, processed fluid removed from the bottom portion 73 may be collected in a catch basin (not shown) situated near drain hole(s) 732 or by any other means known in the art. In an embodiment, the processed fluid may be recycled back through reactor 70 one or more additional times for further processing. In another embodiment, the processed fluid may be directed elsewhere, for example, to a reservoir for storage or transport, or to a heat exchanger.

As illustrated, bottom portion 73 may be flat in shape. However, it should be appreciated that bottom portion 73 may be conical, parabolic, or provided with any other geometric shape which can complement the geometric profile of the bottom end 722 of body portion 72. The bottom portion 73 can be made from any solid material similar to the material from which body portion 72 is made, including metal, metal alloy, plastic, glass, quartz, ceramic, or any other solid materials that can be maintained at a certain temperature, and/or permit a change in temperature as necessary.

Figure 10A:
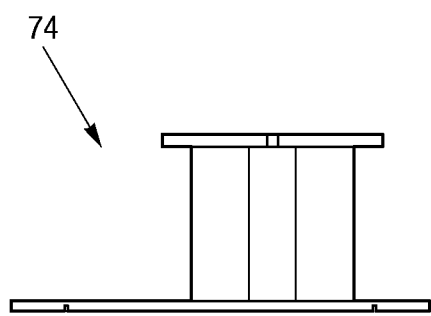
FIG. 10A illustrates a side view of a top portion of a processing reactor according to an embodiment of the present disclosure.
Figure 10B:
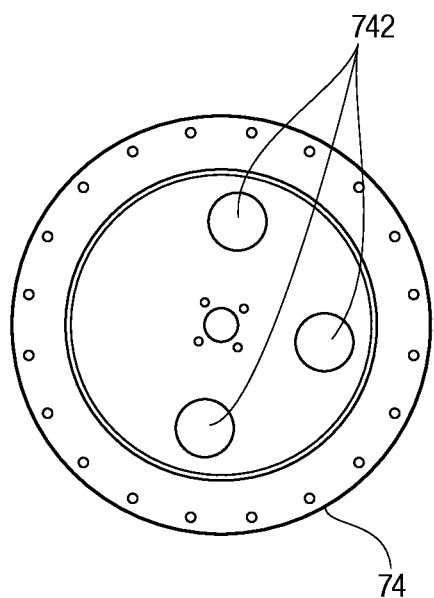
FIG. 10B illustrates a top view of the top portion of FIG. 9A, according to an embodiment of the present disclosure.

Referring now to FIGS. 10A and 10B, reactor 70 may further include a top portion 74 for collecting evaporated vapor from fluids being processed within vessels 71. Also, the top portion 74 may be designed to introduce other fluid or fluids into the vessels 71 for use in connection with the fluid being processed.

In one embodiment, top portion 74 may be provided with at least one outlet 742 to permit removal of any gas or vapor, including gas generated in connection with the processing of the fluid, rising from vessels 71. In one embodiment, when the reactor 70 is used in an evaporative process, the exhaust outlet(s) 742 can permit removal of vapor generated from the evaporation of the fluid flowing along surfaces 723,724 that border annular spaces 76. Once removed, the vapor can be vented, condensed or compressed, as later described.

In one embodiment, top portion 74 may be flat in shape. However, it should be appreciated that top portion 74 may be provided with any geometric shape which can complement the geometric profile of the top ends 721 of vessels 71. Moreover, since the top portion 74 may need to withstand high pressure, it may be desirable to make the top portion 74 from any solid material similar to the material from which body portion 72 is made, including metal, metal alloy, plastic, glass, quartz, ceramic, or any other solid materials that can be maintained at a certain temperature, and/or permit a change in temperature as necessary.

Flow of Heat Exchange Fluid Through Reactor 70

Figure 11:
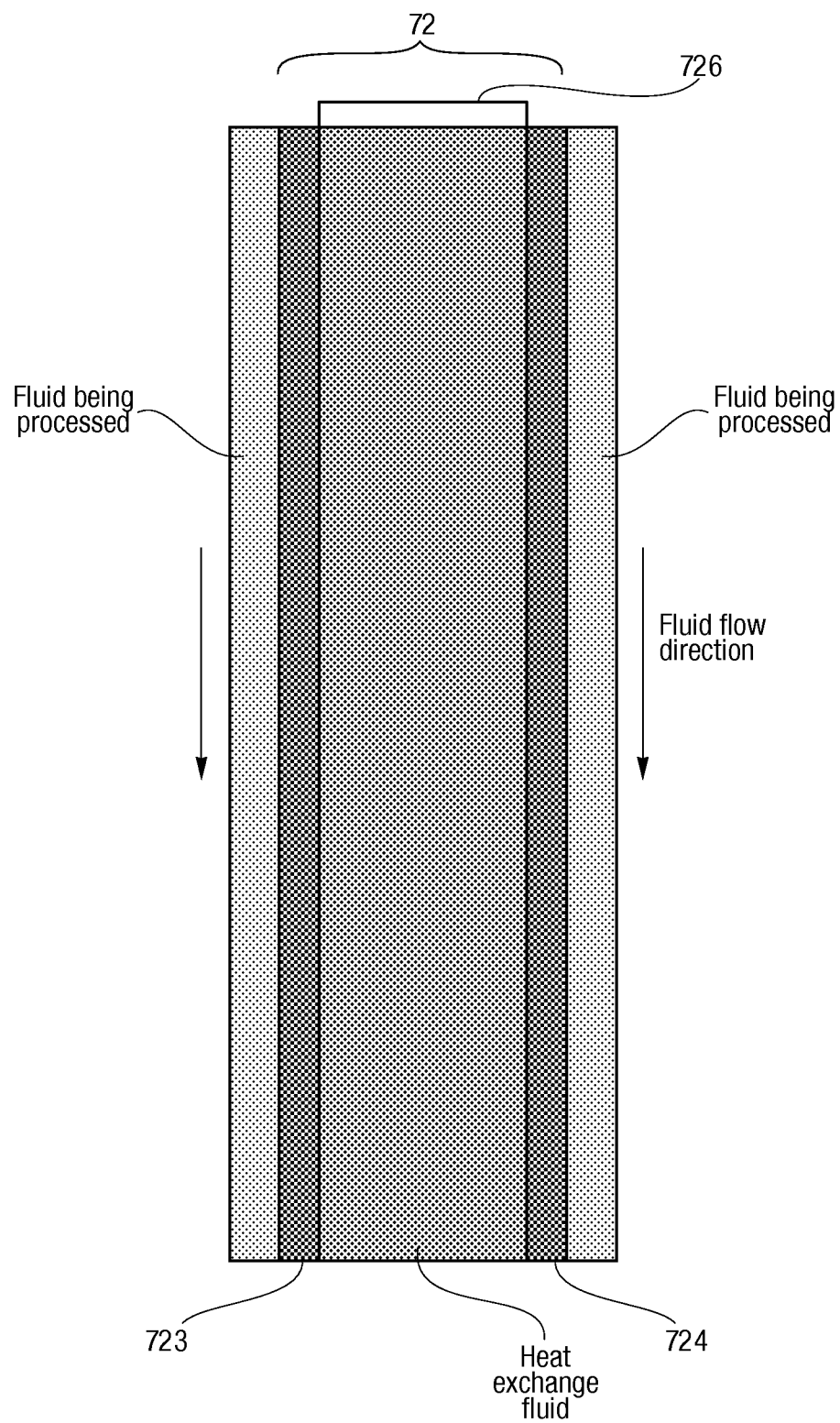
FIG. 11 illustrates a schematic view of a fluid being processed along heat exchange surfaces of a vessel, as facilitated by a heat exchange fluid flowing in a gap between the heat exchange surfaces, in accordance with one embodiment of the present disclosure.
Figure 12A:
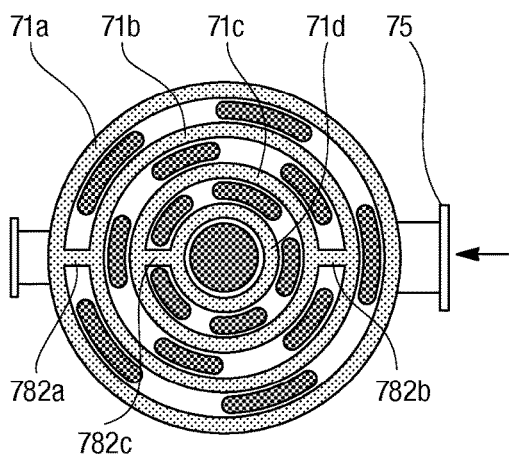
FIGS. 12A-12D schematically illustrate a pathway along which a heat exchange fluid is directed within a reactor, in accordance with one embodiment of the present disclosure.
Figure 12B:
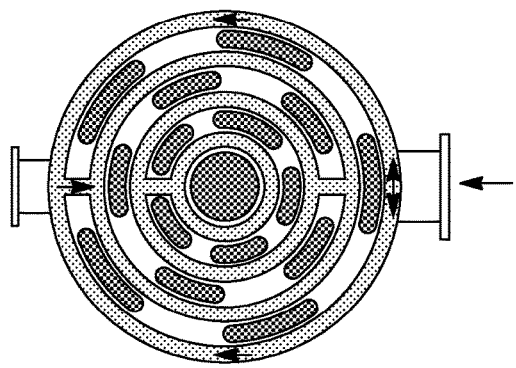
Figure 12C:
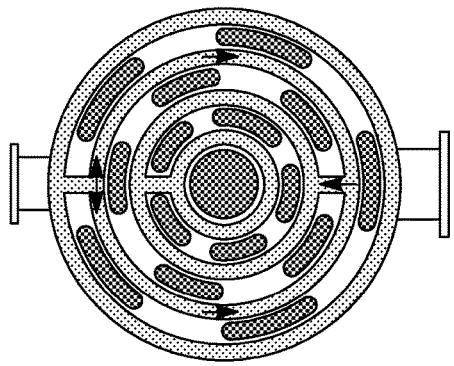
Figure 12D:
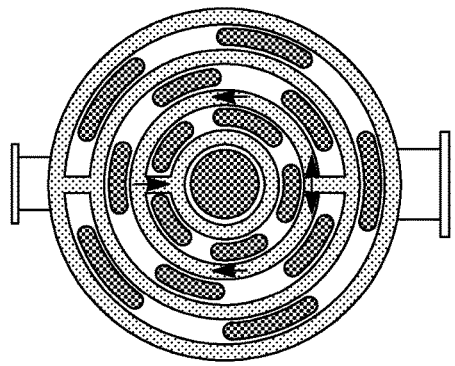

Referring now to FIG. 11, vessels 71 may each include a body portion 72 designed to provide heat exchange surfaces 723,724 within reactor 70. A heat exchange fluid, such as steam, may be directed in proximity to heat exchange surfaces 723,724 to facilitate heat transfer to or away from the fluid being processed along surfaces 723,724. In one embodiment, the heat exchange fluid may be provided at a different temperature relative the fluid being processed flowing along inner surface 723 and outer surface 724 of the vessel 71. This may impart a temperature differential between surfaces 723,724 and the respective fluids being processed there along. By providing the heat exchange fluid with a different temperature, a predetermined amount of thermal energy can be introduced into surfaces 723,724 of vessel 71 to evaporate the fluid being processed on each respective surface and facilitate relatively high transport rates during treatment, processing and/or separation of the fluid flowing there along. Examples of a heat exchange fluid include water, oil, glycol mix, Dow Therm™, or any fluid capable of carrying out heat exchange.

To further impart and enhance the transport rates of the fluid being processed along surfaces 723,724 of vessel 11, an energy source, such as heat pump jacket 711 (not shown), may be provided to act as a source for heating or cooling the heat exchange fluid. For instance, if the evaporation of the descending fluid being processed results in a measurable change in temperature of the heat exchange fluid, jacket 711 may be used to adjust the temperature of the heat exchange fluid up or down, as appropriate, until the desired temperature is achieved to provide controlled evaporation of the fluid being processed along heat exchange surfaces 723,724.

Jacket 711, in one embodiment, may be any commercially available heat pump, and may include inductive, resistive, or conductive elements for providing electromagnetic energy, such as microwave energy, to transfer thermal energy to the heat exchange fluid. The jacket 711 may further include additional components to improve the thermal performance. Alternatively, instead of a heat pump, jacket 711 may be designed to allow another fluid at a relatively raised temperature (e.g. steam) or at a relatively cool temperature to run therethrough, in order to act as a source for heating or cooling the fluid being processed along heat exchange surfaces 723,724 of vessel 71. In an embodiment, jacket 711 may be made from metal, metal alloy, plastic, glass, quartz, ceramic, or any other materials that can maintain and impart heat or cold temperatures.

The heat exchange fluid may be directed in proximity to one or both heat exchange surfaces 723,724 of a vessel 71 along any suitable vessel pathway 728 (not shown). In an embodiment, vessel pathway 728 may extend along a circumference of body portion 72 of vessel 71 to provide substantially uniform circumferential distribution of the heat exchange fluid along surfaces 723,724. In another embodiment, vessel pathway 728 may also be of similar axial dimensions as surfaces 723,724 to provide substantially uniform axial distribution of the heat exchange fluid along surfaces 723,724. In particular, as previously noted, the body portion 72 may include a gap 726, between an inner surface 723 and an opposing outer surface 724, defining vessel pathway 728 along which the heat exchange fluid may be directed.

Referring now to FIGS. 12A-12D, one or more of the individual vessel pathways 728 may be connected to form a continuous pathway 78. Heat exchange fluid may be directed along this pathway continuously from one vessel 71 to the next, passing through the corresponding individual vessel pathways 728 of each to heat or cool the fluid being processed on the associated heat exchange surfaces 723,724.

In particular, reactor 70 may include conduits 782 for connecting gaps 726 of successive vessels 71 to form continuous pathway 78. As shown, this pathway 78 extends from the outermost vessel 71a to the innermost vessel 71d, but flow in the opposite direction is certain contemplated herein as well. The heat exchange fluid enters gap 726a (note that while shown as solid here for simplicity, vessels 71a-d include gaps 726a-d in an interior of body portions 72a-d, respectively) of outermost vessel 71a through an inlet 75, where it then splits and progresses around both sides of the vessel. These flows meet on the other side and enter conduit 782a, through which the recombined flow crosses annular space 76a and flows into gap 726b of adjacent vessel 71b. The heat exchange fluid again splits, and flows gap 726b about the circumference of vessel 71b until these flows again meet and enter conduit 782b. The heat exchange fluid continues this path from vessel to vessel until it flows through gap 726d of innermost vessel 71d. In one embodiment, the pressure of additional heat exchange fluid being fed into an upstream portion of continuous pathway 78 serves to advance the flow of downstream heat exchange fluid therein.

It should be noted that, in this particular embodiment, conduits 782a,b,c are situated on alternating sides of reactor 70. Such an arrangement forces the heat exchange fluid to follow pathway 78 about the circumference of each individual vessel 71, thereby providing substantially uniform heat transfer along the length of heat exchange surfaces 723,724 associated therewith.

Figure 13:
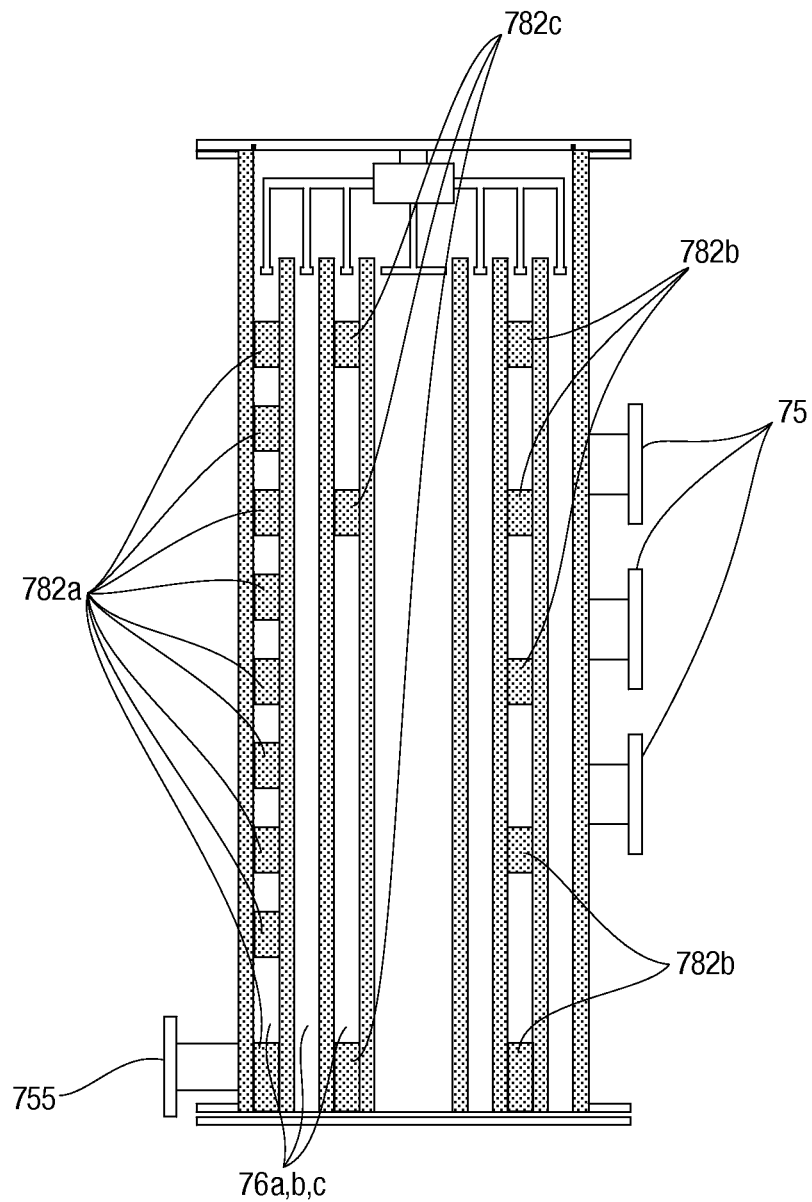
FIG. 13 illustrates a plurality of conduits through which a heat exchange fluid may be directed between vessels of a processing reactor, in accordance with an embodiment of the present disclosure.
Figure 14A:
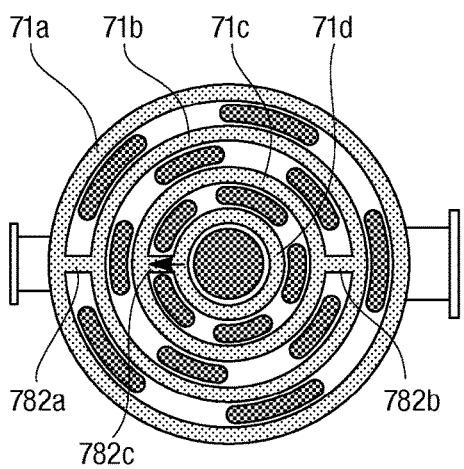
FIGS. 14A-14D schematically illustrate a pathway along which a condensate is directed towards an outlet of a reactor, in accordance with one embodiment of the present disclosure.
Figure 14B:
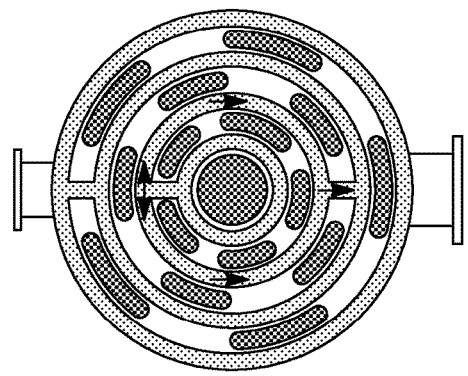
Figure 14C:
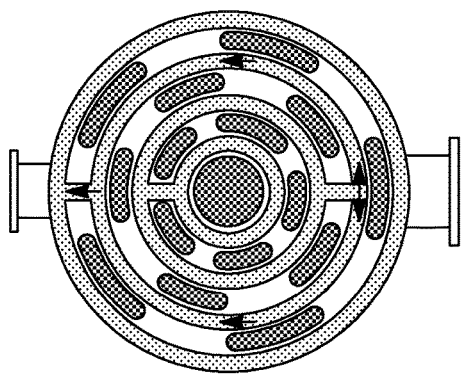
Figure 14D:
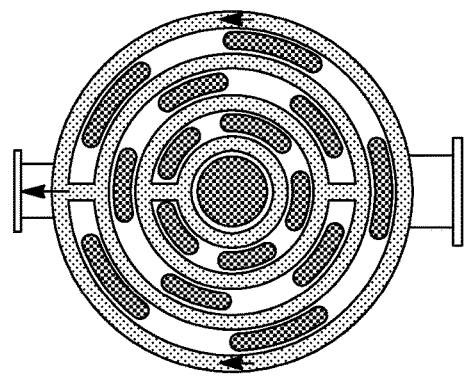

Continuous pathway 78 may also be configured to provide substantially uniform axial distribution of heat along surfaces 723,724. For example, as shown in FIG. 13, a plurality of axially distributed conduits 782 may span each annular space 76 in order to distribute the heat exchange fluid along the height of each heat exchange surface 723,724. Likewise, multiple inlets 75 may be axially distributed along outermost vessel 71a to direct the heat exchange fluid throughout the height of gap 726a and heat exchange surfaces 723,724 associated therewith. The use of multiple inlets 75 may also provide for the heat exchange fluid to enter vessel 71a with minimal pressure drop.

As the heat exchange fluid progresses along continuous pathway 78 of reactor 70, it may lose or gain energy depending on whether it is providing a heating or cooling effect, respectively, to the fluid being processed. Accordingly, the heat exchange fluid may be fed into reactor 70 via inlet(s) 75 at a different temperature and pressure than that at which it exits reactor via outlet(s) 755. In a heating embodiment, such as when reactor 70 is used to evaporate a portion of the fluid being processed, the heat exchange fluid may be fed into reactor 70 at a relatively higher temperature and pressure than that at which it exits. In one such embodiment, the heat exchange fluid, in the form of steam, is fed into inlets 75 at about 245 degrees F. at a pressure of about 12 psig. It should be recognized; however, that suitable temperatures and pressures can vary widely. For example, in various embodiments, the heat exchange fluid may be fed into reactor 70 at temperatures ranging between about 212 degrees F. and about 350 degrees F., and at pressures ranging between about 0 psig and 50 psig. Of course, these are merely illustrative ranges, and the present disclosure is not intended to be limited as such. One of ordinary skill in the art will recognize suitable temperatures and pressures at which the heat exchange fluid may be fed into reactor 70 depending on the particular construction of reactor 70 and a given application.

The aforementioned energy loss may result in a phase shift in the heat exchange fluid as it progresses through pathway 78; for example, heat exchange fluid in the form of steam or other gas may progressively condense into a liquid as heat is drawn away from it to evaporate the fluid being processed. This condensate may flow down the walls of gap 726 and collect along the bottom thereof. Referring now to FIGS. 14A-14D, in order to evacuate this heat exchange fluid condensate, reactor 70 may include a condensate pathway 784 situated at the bottom of gaps 726 along which the condensate is directed towards a condensate outlet 755. Generally speaking, condensate pathway 784 may follow the opposite course as heat exchange fluid pathway 78, flowing from inner to outer vessels 71 to escape reactor 70. Like the heat exchange fluid flowing along pathway 78, pressure from upstream condensate, as well as in some cases pressure from the nearby steam, may serve to push the heat exchange fluid condensate through gap 726 of each successive vessel 71 and through conduits 782 spanning the bottom of each annular space 76 before escaping reactor 70 through outlet 755. In some embodiments, the removed condensate may be re-heated by a boiler or other heat source to convert it again to steam for repeated use as a heat exchange fluid.

Of course, a similar, if somewhat reversed, embodiment is contemplated for cooling applications. That is, heat exchange fluid in liquid form may progressively change into a vapor as heat is drawn towards it from a hot fluid being processed. In order to evacuate this heat exchange fluid vapor, reactor 70 may include a vapor pathway 786 (not shown) situated at the top of gaps 726 along which the vapor is directed towards a vapor outlet (not shown). In some embodiments, the removed vapor may be condensed back into liquid form for re-use as a cooling heat exchange fluid. Alternatively, the vapor may be vented into the atmosphere via outlets at the top of each gap, or after passing along vapor pathway 786 and through the vapor outlet.

These changes in the temperature of the heat exchange fluid can also affect the pressure of the heat exchange fluid within pathway 78. That is, as the heat exchange fluid cools, its pressure decreases, and vice versa. As such, the required flow capacity (i.e., the inner diameter and/or number) of those conduits 782 connecting vessels 71 situated closer to the center of reactor 70 may be different than that of those conduits connecting vessels situated closer to the periphery of reactor 70. Accordingly, reactor 70 may require, in a cooling example as shown back in FIG. 13, fewer and/or smaller diameter conduits 782 closer to the center of reactor 70 than in outer portions. Of course the opposite is true for heating embodiments. One of ordinary skill in the art will recognize suitable conduit configurations to accommodate these pressure variances throughout reactor 70.

Flow of Fluid being Processed Through Reactor 70

Figure 15:
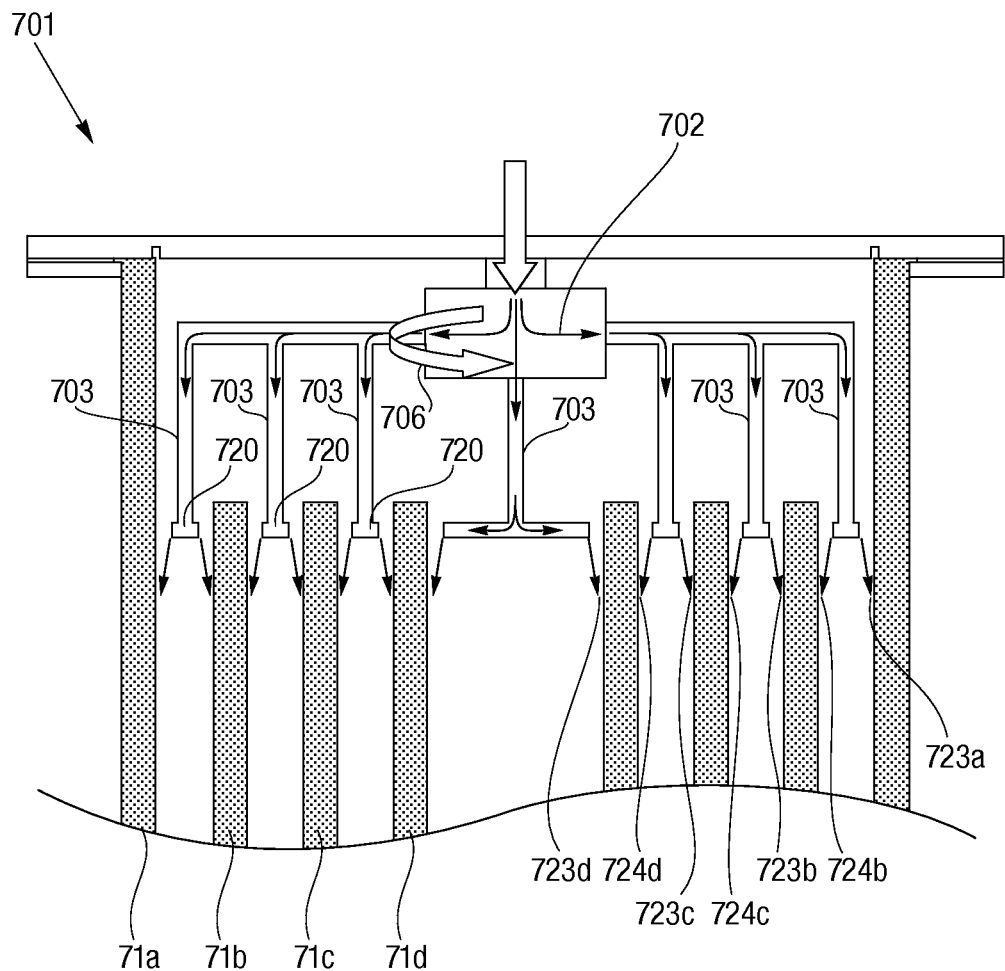
FIG. 15 schematically illustrates a fluid dispensing system of a processing reactor in accordance with one embodiment of the present disclosure.

One of the advantages of the reactor 70 of the present invention is the ability to provide a controlled thin film flow along heat exchange surfaces 723,724 of vessels 71 to facilitate vapor generation for the fluid being processed. To do so, reactor 70 utilizes, in accordance with one embodiment, a fluid dispensing system 701, as illustrated in FIG. 15. Dispensing system 701, in an embodiment, may include a rotatable T-shaped pathway 702, designed to introduce the fluid being processed from a fluid source (not shown) into the interiors of vessels 71. Dispensing system 701 may also include a plurality of fluid communicating members 703, such as feed arms, in fluid communication with pathway 702, so that fluid from pathway 702, if desired, can be continuously directed to and subsequently be dispensed by members 703 onto the heat exchange surfaces 723,724 of vessels 71. In one embodiment, the member 703 may be further provided with a plurality of nozzles 720 for dispensing the fluid to be processed towards surfaces 723,724. In an embodiment, spray nozzles 720 may be adjustable nozzles or electronically controllable nozzles. The continuous controlled provision of substantially fine droplets or fiber-like elements on to surfaces 723,724 allows a thin film flow to be formed as the fluid being processed descends along surfaces 723,724.

To avoid dry spots that may lead to corrosion, scaling, or other undesirable effects, dispensing system 701 may be configured to dispense the fluid at a rate sufficient to ensure surfaces 723,724 remain wetted. In various embodiments, this is accomplished, at least in part, by distributing the fluid to be processed at a greater flow rate than that at which the fluid is evaporated on surfaces 723,724.

Still with reference to FIG. 15, the dispensing system 701 may be concentrically positioned within the reactor 70, such that the T-shaped pathway 702 and vessels 71 may be in substantial axial alignment with one another. According to one embodiment, when the dispensing system 701 dispenses the fluid to be processed towards surfaces 723,724 of vessels 71, the T-shaped pathway 702 can rotate about an axis in substantial axial alignment with the vessels 71. Alternatively, vessels 71 can be rotated about an axis and the T-shaped pathway 702 can be kept stationary when the dispensing system 701 may dispense the fluid to be processed. According to another embodiment, the T-shaped pathway 702 and the vessel may be stationary while flow rate of the fluid to be processed may be varied to provide a thin film flow of the fluid to be processed along surfaces 723,724.

In an embodiment, the size and diameter of vessels 71, the spans of the T-shaped pathway 702, the lengths and diameters of the fluid communicating members 703, or any relative ratio of these dimensions to others can vary and can be determined depending on the particular application.

According to one embodiment, fluid communicating members 703 may extend into annular spaces 76 and include multiple ports or nozzles 720 distributed axially there along to distribute the fluid at multiple locations along the height of surfaces 723,724. In particular, as the thin film of fluid moves down surfaces 723,724, the flow may thin out to a point where the heat from the heat exchange fluid may dry out the thin film near the bottom of surfaces 723,724 and cause scaling. By placing the ports 720 in the axially distributed manner described, fluid can be dispensed substantially along the length of surfaces 723,724 from top to bottom, in a controlled manner, to form a substantially uniform thin film flow, and thereby minimize thinning of the fluid flow and allow for controlled evaporation of the fluid. It should be recognized that the present disclosure should not be limited to the particular embodiments set forth herein, and that dispensing system 701 may comprise any suitable configuration suitable to dispense the fluid substantially along the length of surfaces 723,724 from top to bottom, in a controlled manner, to minimize thinning of the fluid flow and allow for controlled evaporation of the fluid.

Dispensing system 701 may further include a motor (not shown) designed to actuate rotation of the T-shaped pathway 702, for instance, in the direction shown by arrow 706, and thus rotation of members 703. The motor, in an embodiment, may be coupled to an end of pathway 702 opposite that to which members 703 are positioned and may be designed to rotate at a sufficient rate. In one embodiment, the rate of rotation of the motor may be controlled so that the rate of rotation can be varied, as desired. For example, the rate can be varied in order to ensure a disturbed flow in a thin film when the flow rate of the fluid may have changed.

Example I

An example is provided to further understanding to the present invention. In this example, reactor 70 is approximately 26.25 inches in diameter, giving it a footprint of approximately 3.8 square feet. Processed fluid enters through a 1 to 2 inch diameter fluid inlet 702 and exits through a 3 inch diameter reject outlet 734. Evaporation from the fluid being processed exits through three evaporation outlets 742, each about 4 inches in diameter. Steam enters through three steam inlets 75, each about 4 inches in diameter, and condensate formed from the steam during processing exits through a 3 inch diameter outlet 755.

Reactor 70 includes four concentrically arranged vessels 71a-d, each about 66 inches in height except for the outermost vessel, which is 72 inches in height. Outermost vessel 71a includes an inner heat exchange surface 723a, and vessels 71b-d internal thereto each include inner and outer heat exchange surfaces 723b-d, 724b-d, respectively, for a total of seven heat exchange surfaces in this embodiment of reactor 70. Representative dimensions of reactor 70, in this particular embodiment, are set forth in the following table:

TABLE I

Representative dimensions of reactor vessels and corresponding surface areas for processing a fluid

| Vessel | Surface | Diameter (in) | Surface Area (sqft) |
|---|---|---|---|
| 71a | 274a | — | — |
|  | 273a | 24 | 38 |
| 71b | 274b | 20.125 | 29 |
|  | 273b | 18 | 26 |
| 71c | 274c | 14.125 | 20 |
|  | 273c | 12 | 17 |
| 71d | 274d | 8.125 | 12 |
|  | 273d | 6 | 9 |
|  |  |  | 151 |

Due to the nesting arrangement of vessels 71, processing surface area and processing rates progressively decrease towards the center of reactor 70 as the vessels 71 become smaller and smaller.

It should be appreciated that reactor 70, through its inclusion of a plurality of vessels 71, provides a significantly greater processing area than that of single-vessel reactors of the similar outer dimensions. For example, as shown in Table I, the seven heat exchange surfaces of reactor 70 provide a cumulative total of about 150 square feet of processing surface area. Conversely, a reactor of similar outer diameter having a single vessel of similar size as outer vessel 71a may provide only about 37 square feet of processing area on its inner surface. This represents a nearly four-fold increase in processing area of reactor 70 compared to a single vessel reactor of the same footprint.

Increased processing area allows reactor 70 to accommodate a greater volume of fluid to be processed within a given amount of time. This, in turn, offers the potential for greater processing rates. In particular, reactor 70 of the present example may have the capability of processing approximately 4.8 to 6.0 gallons of fluid per minute collectively amongst its vessels, whereas a single-vessel reactor of similar footprint may only be able to process approximately 1.2 to 1.5 gallons per minute. This too represents a nearly four-fold increase in processing rate of reactor 70 as compared to that of a single vessel reactor of the same footprint.

With such processing rates, in the present example, fluid may be fed into reactor 70 at a rate of about 20 to 24 gallons per minute. This may lead to the processed fluid (i.e., reject fluid) exiting reactor 70 through reject outlet 734 at about 11.2 to 18 gallons per minute.

In order to facilitate processing of the increased flow rate of the fluid being processed, reactor 70 may similarly accommodate about four times as much steam (i.e., heat exchange fluid) throughput. For example, in the present embodiment, reactor 70 may accommodate about 2,400 to 3,300 pounds/hour of steam throughput to process the 4.8 to 6.8 gallons per minute flow rate of fluid being processed, as compared to the only about 600 to 800 pounds/hour of steam needed to process the 1.2 to 1.5 gallons per minute of fluid being processed in single-wall reactor of similar footprint.

Operation of Reactor 70

Figure 16:
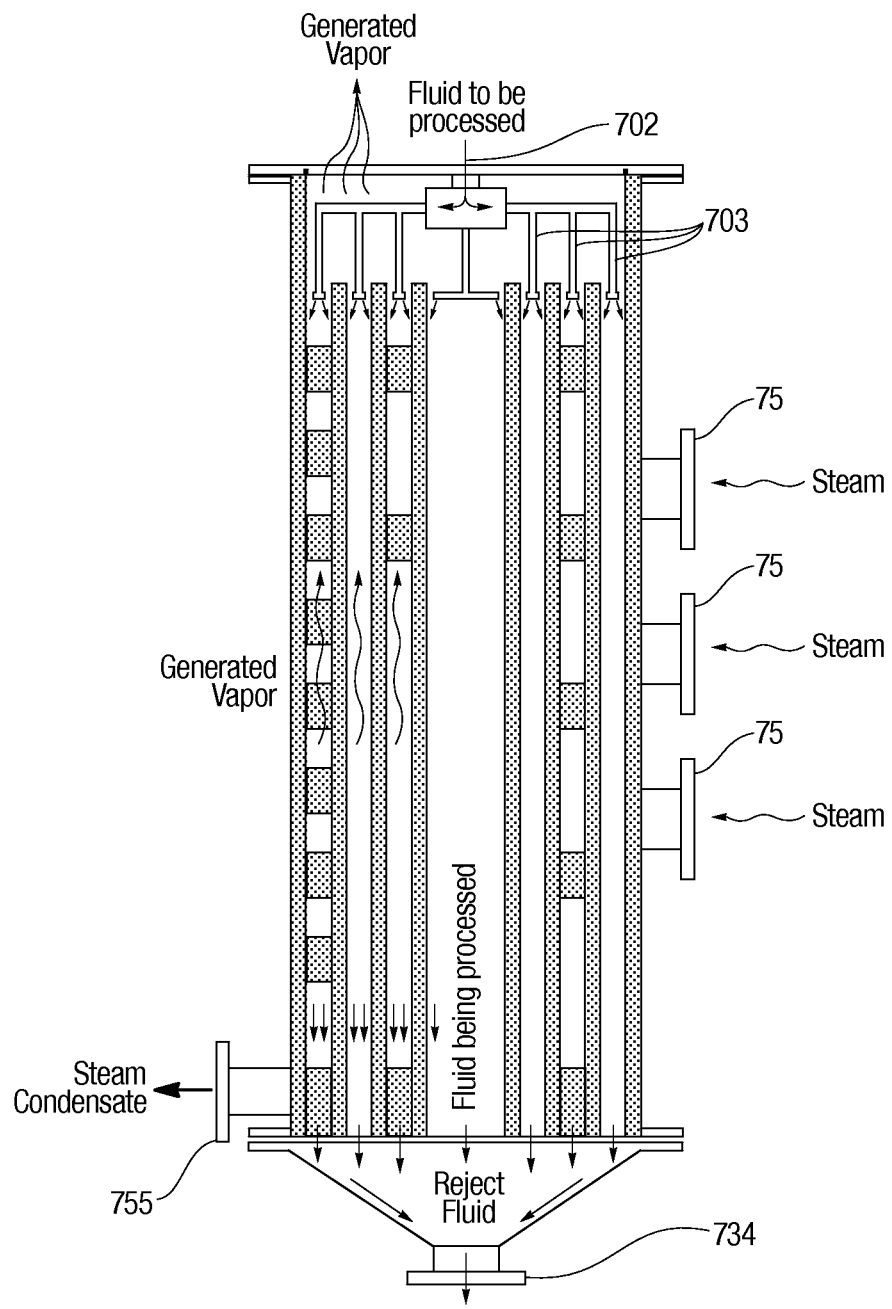
FIG. 16 schematically illustrates flows of a fluid being processed, vapor generated therefrom, a heat exchange fluid, and condensate formed therefrom, through a processing reactor in operation, in accordance with one embodiment of the present disclosure.

In operation, looking again at FIG. 16, a fluid being processed, in general, may be substantially continuously introduced into vessels 71 of reactor 70 through pathway 702. Next, the fluid being processed may be directed into the members 703 where, it may be directed outward toward nozzles 720 for distribution as substantially fine droplets, fiber-like elements, or as a quiescent or non-turbulent stream on to the inner and outer surfaces 723,724 of vessels 71. The continuous provision of substantially fine droplets or fiber-like elements on surfaces 723,724 allows a thin film flow to be formed as the fluid being processed descends along the surfaces 723,724. Additionally, as fluid continues to be dispensed, newly dispensed fluid onto surfaces 723,724 can disturb the thin film flow, and aid in reduction of scaling during evaporation and the processing of the fluid.

Once the fluid being processed is dispensed onto surfaces 723,724, a heat exchange fluid, at a temperature different from that of the fluid being processed, may be provided along pathway 78. In the presence of heat provided by the heat exchange fluid, the fluid being processed evaporates within vessels 71. Corresponding cooling of the heat exchange fluid resulting from this heat transfer may cause the heat exchange fluid to condense into a liquid form, flow down the walls of gaps 726, and be directed out of reactor 70 through outlet 755.

Vapor generated within annular spaces 76 between vessels 71 may travel up the center of the annular spaces 76 between the thin films of fluid being processed flowing down the bordering surfaces 273,274. The vapor may collect near top portion 74 and be directed through vapor outlets 742 to exit reactor 70.

For any remaining fluid descending the surfaces 723,724, once it reaches bottom portion 73, it can be directed into outlet 734 and removed from reactor 70.

The design of the reactor 10 of the present invention, which provides a controlled thin film flow, an increase in the surface area as well as the residence time for which the fluid can be processed, i.e. evaporated, and the ability to impart a difference in temperature between the thin film fluid being processed and the heat exchange surface, can enhance treatment, processing and/or evaporation of the fluid being processed, while imparting such fluid with relatively high transport rates. In addition, because of the ability to continuously control thin film flow of fluid over a substantially large surface area, reactor 70 of the present invention can reduce scaling along the heat transfer surfaces, i.e. surfaces 723,724 during evaporation, and can provide substantially high throughput processing of the fluid or fluids involved.

Volume Reduction and Volume Recovery

Figure 17:
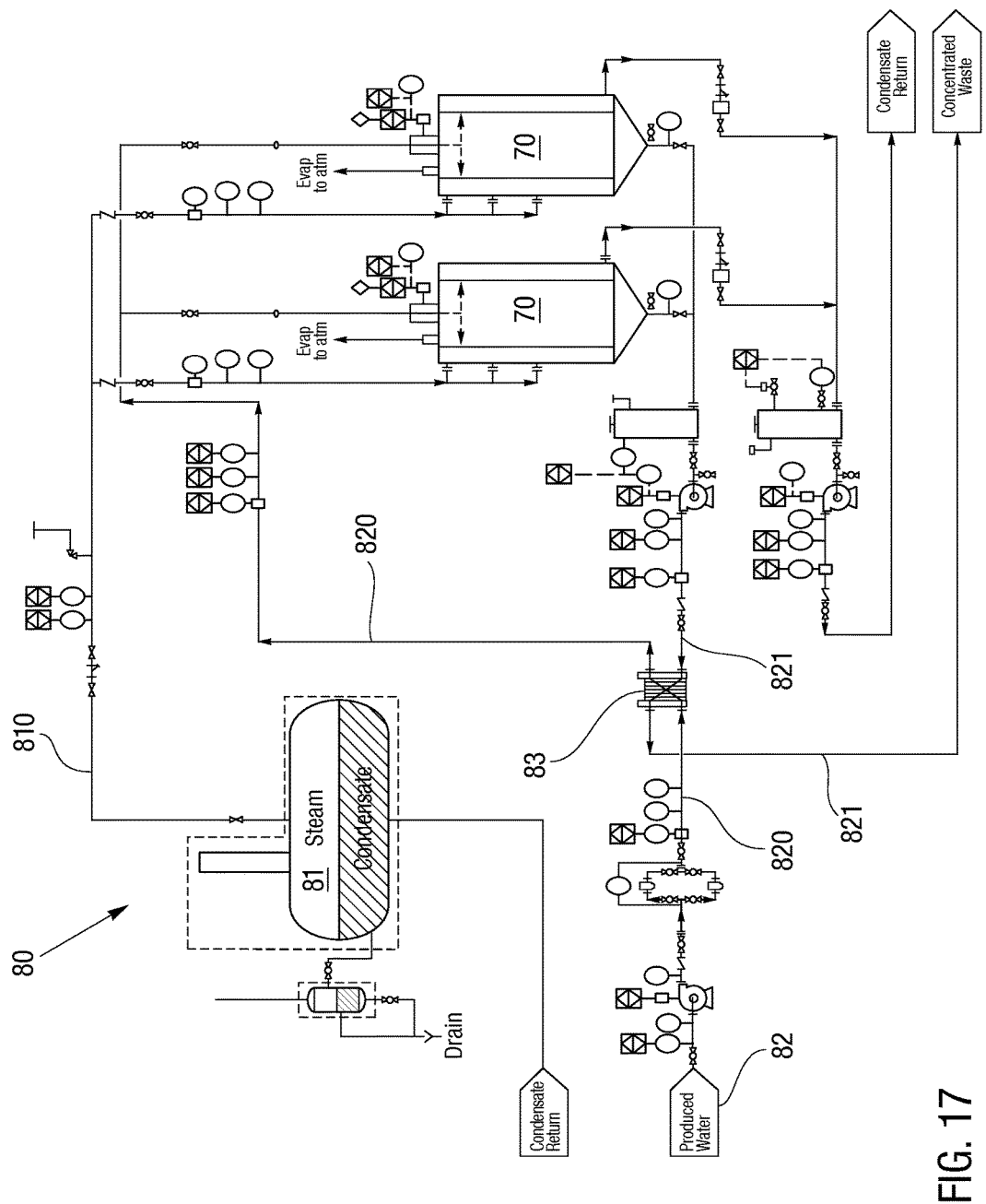
FIG. 17 illustrates a processing system according to an embodiment of the present disclosure.
Figure 18:
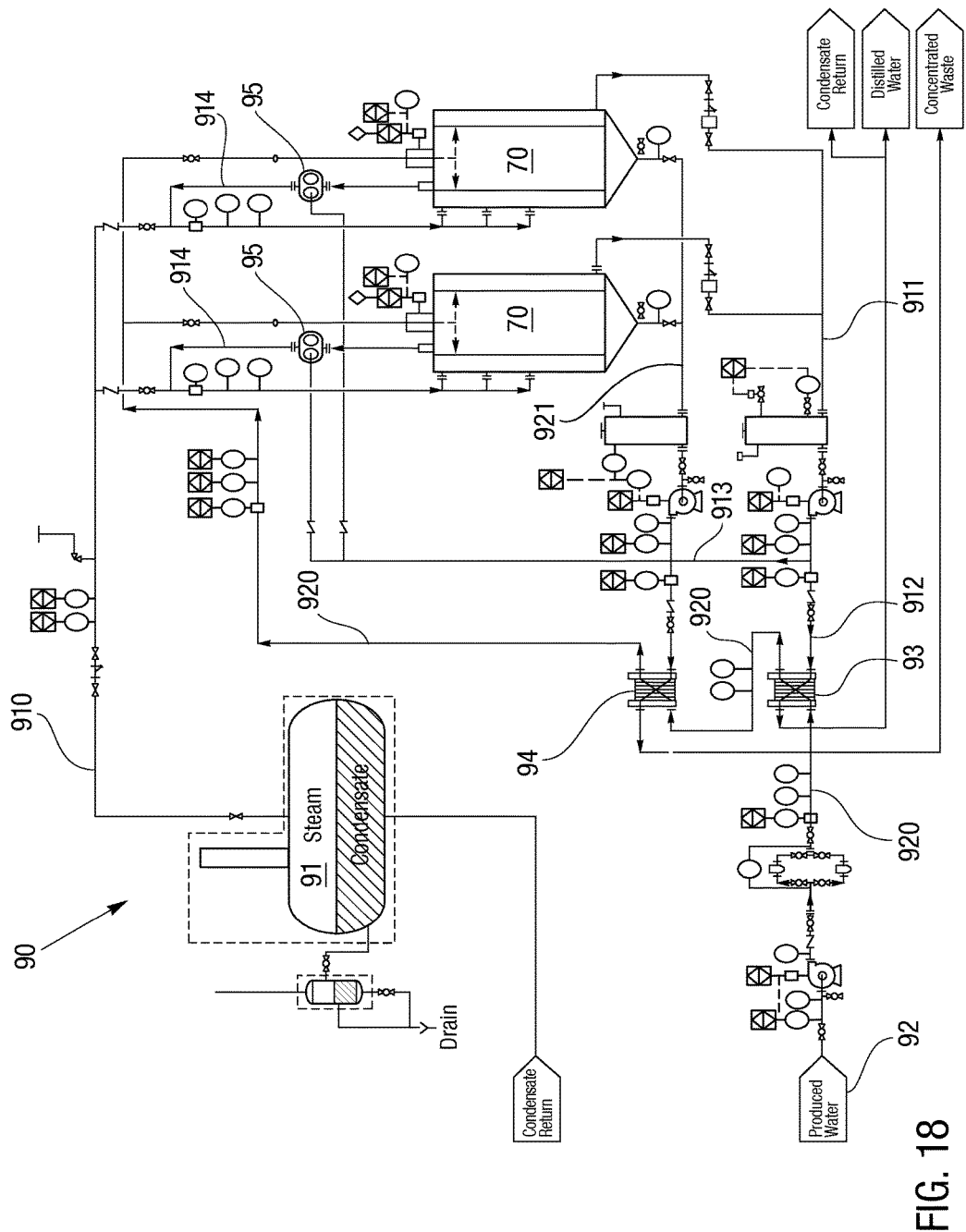
FIG. 18 illustrates a processing system according to another embodiment of the present disclosure.

FIGS. 17 and 18 illustrate representative configurations of reactor systems 80 and 90, and parts thereof. It should be understood that the components of reactor systems 80 and 90, and parts thereof shown in FIGS. 17 and 18 are for illustrative purposes only, and that any other suitable components or subcomponents may be used in conjunction with or in lieu of the components comprising reactor systems 80 and 90 described herein.

As illustrated in FIG. 17, a reactor system 80 is provided for processing fluid in accordance with an embodiment of the present invention. According to one embodiment, a boiler 81 may be initially used to generate a supply of fluid vapor (i.e., a heat exchange fluid) to provide, via a pathway 810, thermal energy to heat exchange surfaces 723,724 of reactors 70.

A fluid to be processed in reactors 70 may be provided by a supply pathway 820 from a fluid source 82. In an embodiment, one or more heat exchangers, such as heat exchanger 83, may be in fluid communication with, and in proximity to, reactors 70 along pathway 821. In various embodiments, a pathway, such as pathway 821, may direct a processed fluid from reactors 70 to heat exchanger 83 to transfer heat from the processed fluid to the fluid to be processed, thereby pre-heating the fluid to be processed. A heat exchanger using heat from condensate may also be used to pre-heat the fluid to be processed.

The fluid to be processed may continue to be directed along pathway 820 into reactors 70 for processing. During the course of processing, a portion of the fluid being processed will be evaporated and directed out of reactors 70 into the atmosphere. A volume of fluid (i.e., processed fluid) will continue to flow down surfaces 273,274 and be directed out of reactors 70.

As previously noted, this processed fluid may be directed along pathway 821 towards heat exchanger 83 for preheating incoming fluid to be processed. The processed fluid may then be directed along pathway 821 towards a reservoir for storage or transportation, or may be recycled to the inlet to further concentrate the processed water.

Embodiments of system 80 may be used in volume reduction applications, amongst others. That is, system 80 may be utilized to reduce the volume of a fluid by evaporating a portion of it into the atmosphere. This may be particularly useful in situations where storage capacity for the fluid is limited, or if the fluid must be transported, as may be the case with "produced water" or other waste fluids from oil wells.

The amount of fluid evaporated and released into the atmosphere, in some cases, may be based on the total dissolved solids (TDS) of the fluid being processed. System 80 can produce a processed fluid reaching saturation. For example, a salty water stream that is mostly comprised of water and salt can be concentrated to a TDS level of approximately 266,000 ppm. This is because the saturation limit of brine is about 26.6% or 266,000 ppm. Although system 80 could continue to concentrate the salt water, as the TDS were allowed to rise above 266,000 ppm, salt crystals may begin to form and may cause operational problems in certain components of system 80, such as pumps, heat exchangers, and others. In the case of upstream oil & gas waste, a typical saturation limit may be closer to 350,000 ppm because there are a number of contaminants in the water.

For illustrative purposes, a volume reduction example is provided. An upstream oil & gas fluid having a TDS of about 150,000 ppm is to be processed. The fluid may be processed until the processed fluid reaches about 350,000 ppm. At that rate, for every 100 gallons processed, 58 gallons may evaporate, leaving behind 42 gallons of processed fluid. The customer's waste fluid handling is reduced by 58%, meaning they only have to carry 42% of their original waste fluid for disposal.

As illustrated in FIG. 18, a reactor system 90 is provided for processing fluid in accordance with an embodiment of the present invention. Unlike system 80, which may, in some embodiments, be used for volume reduction, system 90 may be used in volume recovery applications. According to one embodiment, a boiler 91 may be initially used to generate a supply of fluid vapor (i.e., a heat exchange fluid) to provide, via a pathway 910, thermal energy to heat exchange surfaces 723,724 of reactors 70.

A fluid to be processed in reactors 70 may be provided by a supply pathway 920 from a fluid source 92. In an embodiment, one or more heat exchangers, such as heat exchangers 93 and 94, may be in fluid communication with, and in proximity to, reactors 70 along pathways 912 and 921, respectively.

In various embodiments, pathway 921 may direct processed fluid from reactors 70 to heat exchanger 94 to transfer heat from the processed fluid to the fluid to be processed, thereby pre-heating the fluid to be processed. Additionally or alternatively, pathway 912 may direct one or more heating fluids from reactors 70 to heat exchanger 93 to transfer heat from the heating fluid to the fluid to be processed, thereby pre-heating the fluid to be processed as well.

In the embodiment shown, the heating fluid may include a combination of generated vapor (i.e., vapor generated from processing the fluid in reactors 70) and heat exchange fluid (i.e., steam from boiler 91). In particular, generated vapor from reactors 70 may be directed towards compressors 95, where it is compressed to increase its thermal energy. The compressed vapor may then be directed along pathway 914, where it is mixed with steam from boiler 91 being directed along pathway 910.

This combination may then be routed into steam inlets 75 of reactors 70 for further heat transfer to the fluid being processed. Condensate formed from the combination then exits reactors 70 and is directed along pathway 911. In an embodiment, a portion of this condensate may be directed along pathway 913 towards compressors 95 to cool the super-heated steam being directed therethrough. Additionally or alternatively, the condensate travelling along pathway 911 may continue along pathway 912 towards heat exchanger 93, and then continue towards a reservoir delivery to the customer as fresh water.

Embodiments of system 90 may be used in volume recovery applications, amongst others. That is, system 90 may be utilized to reduce the volume of a fluid by evaporating a portion of it, but rather than vent that evaporated portion into the atmosphere, it is recovered as fresh water. Also, system 90 provides the added benefit of reduced energy consumption. In particular, unlike system 80 which relies on boiler 81 to provide the necessary heat to the system for processing the fluid, system 90 may utilize a much smaller pressure boiler 91 to create low pressure saturated steam for startup and supplemental heat when needed, as mechanical vapor compression fulfills most of its energy requirements.

Again, the amount of fluid evaporated, in some cases, may be based on the total dissolved solids (TDS) of the fluid being processed. Referring again to the example of system 80, an upstream oil & gas fluid having a TDS of about 150,000 ppm is to be processed, only this time utilizing system 90. The fluid may be processed until the processed fluid reaches about 350,000 ppm. At that rate, for every 100 gallons processed, 58 gallons may evaporate, leaving behind 42 gallons of processed fluid. The customer's waste fluid handling is reduced by 58%, meaning they only have to carry 42% of their original waste fluid for disposal. In this example, system 90 also provides the added benefit of recovering the 58% of the waste fluid as fresh, usable water. The water can be used for various purposes including, without limitation, for making, on-site, new fracking fluid to pump back down a well.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the claims appended hereto.

What is claimed is:

1. A reactor comprising:
   a plurality of vessels, each having at least one heat exchange surface along which a fluid being processed can flow as a thin film, the plurality of vessels being arranged in a concentric manner so as to provide increased surface area within a given footprint for processing the fluid;
   a plurality of annular spaces, each situated between adjacent vessels, for accommodating the fluid being processed and processing by-products thereof; and
   a pathway for directing a heat exchange fluid from one vessel to an adjacent vessel, the heat exchange fluid serving to create a temperature differential between the heat exchange surfaces of the vessels and the fluid being processed there along, wherein the pathway extends continuously amongst the plurality of vessels.

2. A reactor as set forth in claim 1, wherein an inner and outer surface of each inner vessel of the plurality of vessels both serve as heat exchange surfaces for the fluid being processed.

3. A reactor as set forth in claim 1, wherein one or more of the heat exchange surfaces includes a profiled pattern to create additional surface area over which the fluid being processed can flow to facilitate one of treatment, processing, separation, an increase in residence time, or a combination thereof.

4. A reactor as set forth in claim 1, wherein one or more of the heat exchange surfaces are coated to facilitate treatment, processing, and/or separation of the fluid being processed.

5. A reactor as set forth in claim 1, wherein each of the annular spaces is of sufficient width to allow for travel of both: a) the fluid being processed along the heat exchange surface(s) bordering the annular space, and b) vapor generated from processing the fluid being processed.

6. A reactor as set forth in claim 1, wherein the annular spaces have a width of between about 0.5 inch and 5 inches.

7. A reactor as set forth in claim 1, wherein the pathway extends about a circumference of each successive vessel before continuing to an adjacent vessel.

8. A reactor as set forth in claim 7, wherein the pathway is defined in part by a gap extending about the circumference of the vessels between an inner surface and an outer surface of each vessel.

9. A reactor as set forth in claim 8, wherein the pathway is further defined by a conduit connecting the gaps of each successive vessel to provide for the heat exchange fluid to flow continuously between the vessels.

10. A reactor as set forth in claim 9, wherein the conduits connecting the gaps of the successive vessels are situated on alternating sides of the reactor such that the pathway enters the gap of a given vessel and travels substantially about the circumference of that vessel before travelling into the gap of the next vessel via the connecting conduit there between.

11. A reactor as set forth in claim 10, including a plurality of conduits between each successive gap, the plurality of conduits being axially distributed along each of the gaps to provide for substantially uniform axial distribution of the heat exchange fluid throughout each of the gaps.

12. A reactor as set forth in claim 11, including a decreasing number of conduits between the successive gaps to account for reducing pressure of the heat exchange fluid as it loses energy through heat transfer to the fluid being processed.

13. A reactor as set forth in claim 1, wherein the pathway includes a plurality of inputs axially distributed along a gap of a first of the vessels to provide for substantially uniform axial distribution of the heat exchange fluid there through.

14. A reactor as set forth in claim 1, further including a fluid dispensing system having a plurality of nozzles directed towards the heat exchange surfaces for distributing the fluid being processed onto the heat exchange surfaces so as to form a thin film flow of the fluid being processed thereon.

15. A reactor as set forth in claim 14, wherein the fluid dispensing system is configured to dispense the fluid being processed at a rate sufficient to form the thin film flow with a thickness of between about 0.5 mm and 1 mm.

16. A reactor as set forth in claim 14, the plurality of nozzles being disposed within the annular spaces and arranged lengthwise along the heat exchange surfaces to distribute the fluid being processed against the heat exchange surfaces in a controlled manner to maintain substantially uniform thin film flow along the length of the heat exchange surfaces.

17. A reactor as set forth in claim 14, wherein the fluid dispensing system is rotatable.

18. A reactor as set forth in claim 1, further including an outlet for removing processed fluid from the reactor.

19. A reactor as set forth in claim 18, further including a plurality of drain holes in fluid communication with the outlet and the annular spaces so as to provide a pathway through which processed fluid may be removed from the vessels.

20. A reactor as set forth in claim 1, further including an outlet for removing generated vapor from the reactor.

21. A reactor as set forth in claim 1, further including an outlet for removing the heat exchange fluid from the reactor.

* * * * *